US009389767B2

(12) United States Patent
Ma et al.

(10) Patent No.: US 9,389,767 B2
(45) Date of Patent: Jul. 12, 2016

(54) SYSTEMS AND METHODS FOR OBJECT TRACKING BASED ON USER REFINEMENT INPUT

(71) Applicant: Cyberlink Corp., Shindian, Taipei (TW)

(72) Inventors: Chih-Chao Ma, Taichung (TW); Ho-Chao Huang, New Taipei (TW)

(73) Assignee: CYBERLINK CORP., Shindian, Taipei (TW)

(*) Notice: Subject to any disclaimer, the term of this patent is extended or adjusted under 35 U.S.C. 154(b) by 241 days.

(21) Appl. No.: 14/337,509

(22) Filed: Jul. 22, 2014

(65) Prior Publication Data

US 2015/0063786 A1    Mar. 5, 2015

Related U.S. Application Data

(60) Provisional application No. 61/872,044, filed on Aug. 30, 2013.

(51) Int. Cl.
*G11B 27/00* (2006.01)
*H04N 5/93* (2006.01)
*G06F 3/0484* (2013.01)
(Continued)

(52) U.S. Cl.
CPC .......... *G06F 3/04845* (2013.01); *G06F 3/0488* (2013.01); *G06K 9/00711* (2013.01); *G06K 9/48* (2013.01)

(58) Field of Classification Search
CPC .................. G06K 9/6204; G06T 2207/20076; G06T 7/0089
USPC .......................................................... 386/378
See application file for complete search history.

(56) References Cited

U.S. PATENT DOCUMENTS 5,940,538 A * 8/1999 Spiegel ................ G06K 9/3216
345/473
5,999,651 A   12/1999 Chang et al.
(Continued)

FOREIGN PATENT DOCUMENTS

FR     2912239 A1   8/2008
WO    00/18128 A1   3/2000

OTHER PUBLICATIONS

Hua Zhong et al. "Interactive Tracker—A Semi-Automatic Video Object Tracking and Segmentation System" Microsoft Research China, 2001.
(Continued)

*Primary Examiner* — Hung Dang
*Assistant Examiner* — Girumsew Wendmagegn
(74) *Attorney, Agent, or Firm* — McClure, Qualey & Rodack, LLP

(57) ABSTRACT

A method for tracking an object in a plurality of frames includes obtaining a contour of an object in a frame. For each remaining frame among the plurality of frames, the following steps are performed. A probability map generator generates a plurality of probability maps containing probability values for one or more pixels for a current frame. A contour is estimated for the current frame based on the plurality of probability maps. User input is obtained for refining the estimated contour. Based on the user input, one or more local regions to be added and/or removed are identified and recorded in a local region list. The local region list is maintained and updated during the tracking process and is used together with the probability map generator.

26 Claims, 20 Drawing Sheets
(8 of 20 Drawing Sheet(s) Filed in Color)

(51) Int. Cl.
*G06F 3/0488* (2013.01)
*G06K 9/00* (2006.01)
*G06K 9/48* (2006.01)

(56) References Cited

U.S. PATENT DOCUMENTS

2014/0133701 A1 5/2014 Ma
2014/0146997 A1 5/2014 Chang et al.

OTHER PUBLICATIONS

Guo et al. "An Interactive Object Segmentation System for MPEG Video" 1999.
Singh et al. "Annotation Supported Contour Based Object Tracking with Frame Based Error Analysis"; ICMLC 2011.
Daras et al. "MPEG-4 Authoring Tool Using Moving Object Segmentation and Tracking in Video Shots" 2002.

* cited by examiner

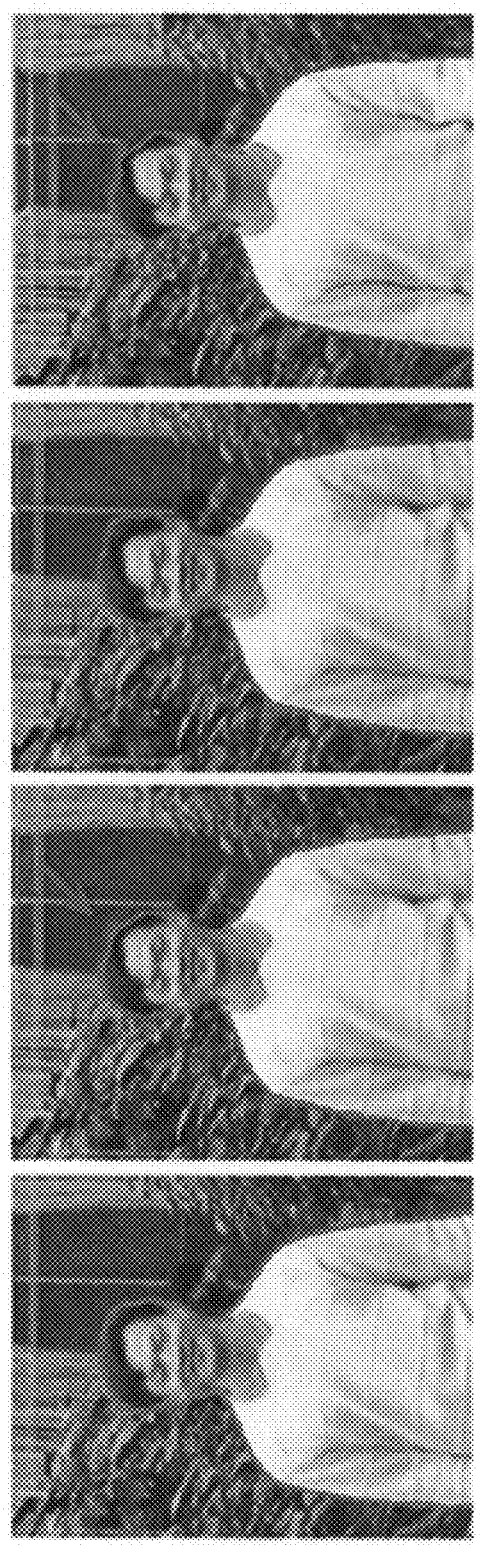

FIG. 16A  FIG. 16B  FIG. 16C  FIG. 16D  FIG. 16E  FIG. 16F

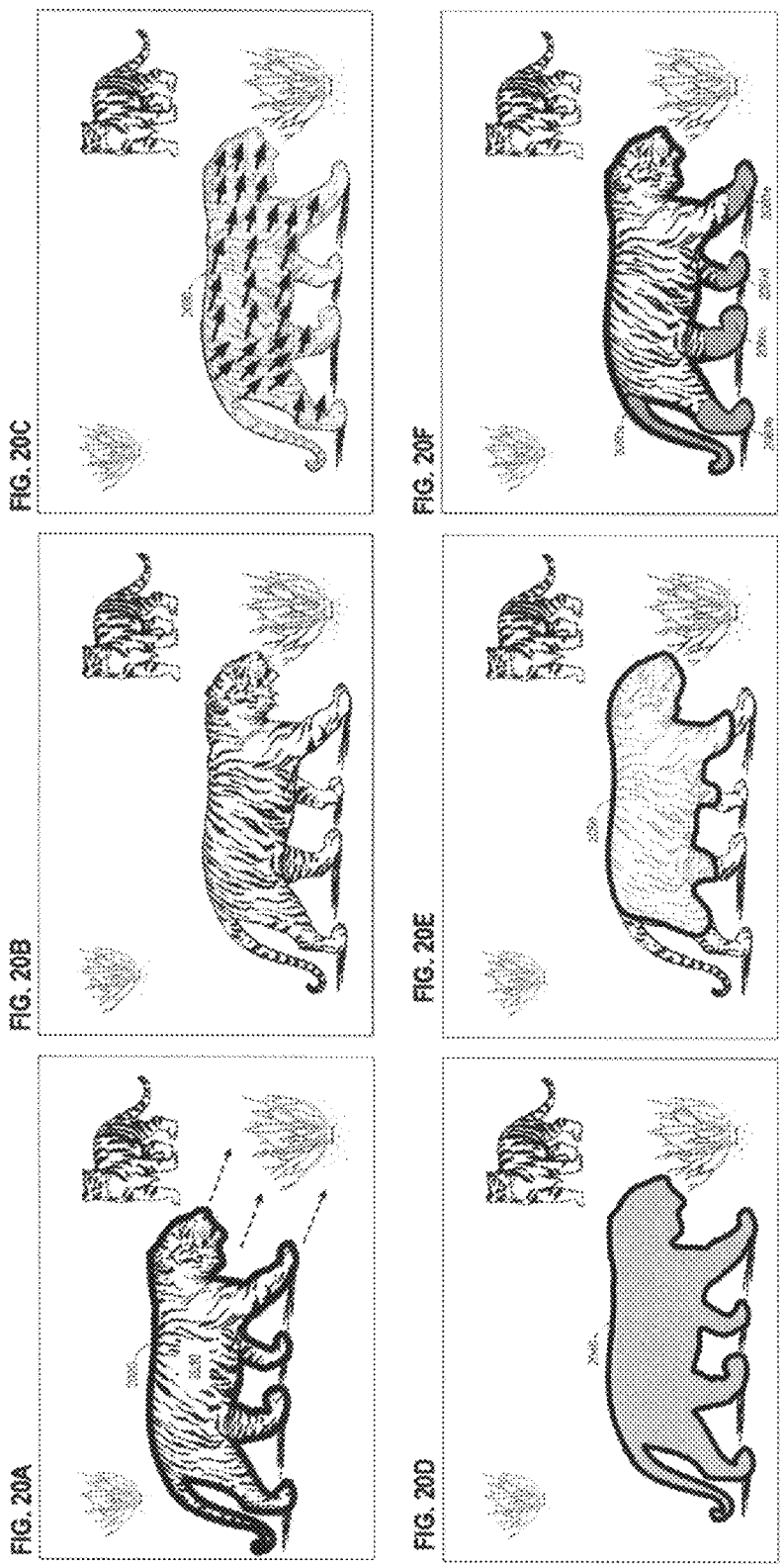

SYSTEMS AND METHODS FOR OBJECT TRACKING BASED ON USER REFINEMENT INPUT

CROSS-REFERENCE TO RELATED APPLICATION

This application claims priority to, and the benefit of, U.S. Provisional Patent Application entitled, "Systems and Methods for Object Tracking Based on User Refinement Input," having Ser. No. 61/872,044, filed on Aug. 30, 2013, which is incorporated by reference in its entirety.

TECHNICAL FIELD

The present disclosure generally relates to video processing, and more particularly, to a system and method for tracking objects based on user refinement input.

BACKGROUND

Over the years, digital content has gained increasing popularity with consumers. With the ever-growing amount of digital content available to consumers through the Internet using computers, smart phones, and other sources, consumers have access to a vast amount of content. Furthermore, many devices (e.g., smartphones) and services are readily available that allow consumers to capture and generate video content.

Upon capturing or downloading video content, the process of tracking objects is commonly performed for editing purposes. For example, a user may wish to augment a video with special effects where one or more graphics are superimposed onto an object. In this regard, precise tracking of the object is important to the video editing process. However, challenges may arise when tracking objects, particularly as the object moves from frame to frame. as the object to vary in shape and size. Additional challenges may arise when the object includes regions or elements that tend to blend in with the background due to the thickness of the elements, the color of the elements, and/or other attributes of the elements.

SUMMARY

Briefly described, one embodiment, among others, is a method implemented in a media editing device for tracking an object in a plurality of frames. The method comprises obtaining a contour of an object in a frame and generating a local region list for storing one or more of: local regions added to the object contour and local regions removed from the object contour. The following steps are performed for each of the remaining frames of the plurality of frames. The local region list is updated. Based on the content of a current frame, the content and the obtained contour of a prior frame, and the local regions in the local region list, a probability map generator generates a plurality of probability maps containing probability values for pixels in the current frame, wherein a probability value of each pixel in a first probability map corresponds to a likelihood of the pixel being located within the object, and wherein a probability value of each pixel in a second probability map corresponds to a likelihood of the pixel being located at a boundary of the object. A contour of the object is estimated for the current frame based on the plurality of probability maps. A determination is made on whether user input for refining the estimated contour is received. In response to receiving user input, one of: at least one local region added to the estimated contour, at least one local region removed from the estimated contour, or any combination thereof. The identified local regions are recorded in the local region list for the current frame. The obtained contour of the current frame is set to one of: the user refined contour or the estimated contour.

Another embodiment is a system for tracking an object in a plurality of frames, comprising a computing device including a processing device and an application executable in the computing device for processing the plurality of frames. The application comprises an object selector for obtaining a contour of an object in a frame; a local region analyzer for generating a local region list for storing one or more of: local regions added to the object contour and local regions removed from the object contour, wherein the local region analyzer is further configured to update the local region list for each of the remaining frames of the plurality of frames; and a probability map generator for generating, for each of the remaining frames of the plurality of frames, a plurality of probability maps containing probability values for pixels in the current frame based on the content of a current frame, the content and the obtained contour of a prior frame, and the local regions in the local region list, wherein a probability value of each pixel in a first probability map corresponds to a likelihood of the pixel being located within the object, and wherein a probability value of each pixel in a second probability map corresponds to a likelihood of the pixel being located at a boundary of the object. The application further comprises a contour estimator for estimating, for the current frame, a contour of the object based on the plurality of probability maps and a refinement module for determining whether user input for refining the estimated contour is received. The local region analyzer is further configured to identify, in response to receiving user input, one of: at least one local region added to the estimated contour, at least one local region removed from the estimated contour, or any combination thereof based on the user input. The local region analyzer is further configured to record, for the current frame, the identified local regions in the local region list, and the contour estimator is further configured to set the obtained contour of the current frame to one of: the user refined contour or the estimated contour.

Another embodiment is a non-transitory computer-readable medium embodying a program executable in a computing device. The program comprises code that obtains a contour of an object in a frame; code that generates a local region list for storing one or more of: local regions added to the object contour and local regions removed from the object contour; and code that updates the local region list for each of the remaining frames of the plurality of frames. The program further comprises code that generates, based on the content of a current frame, the content and the obtained contour of a prior frame, and the local regions in the local region list, a plurality of probability maps containing probability values for pixels in the current frame for each of the remaining frames of the plurality of frames, wherein a probability value of each pixel in a first probability map corresponds to a likelihood of the pixel being located within the object, and wherein a probability value of each pixel in a second probability map corresponds to a likelihood of the pixel being located at a boundary of the object. The program further comprises code that estimates, for the current frame, a contour of the object based on the plurality of probability maps for each of the remaining frames of the plurality of frames; code that determines whether user input for refining the estimated contour is received for each of the remaining frames of the plurality of frames; and code that identifies, in response to receiving user input and based on the user input, one of: at least one local region added to the estimated contour, at least one local region removed from the estimated contour, or any combination thereof for each of the remaining frames of the plurality of frames. The program further comprises code that records, for the current frame, the identified local regions in the local region list for each of the remaining frames of the plurality of frames; and code that sets the obtained contour of the current frame to one of: the user refined contour or the estimated contour for each of the remaining frames of the plurality of frames.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

The patent or application file contains at least one drawing executed in color. Copies of this patent or patent application publication with color drawings will be provided by the Office upon request and payment of the necessary fee.

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 11A illustrates a contour specified by a user.

FIG. 11B illustrates how the tracking algorithm is applied to successive frames to generate an object contour.

FIG. 11C illustrates refinement of the estimated contour by the user.

FIG. 11D illustrates how a conventional tracking algorithm still produces an erroneous result at the same location as before.

FIGS. 16A-F illustrate the use of motion estimation in the tracking algorithm in accordance with various embodiments.

FIGS. 16A and 16B refer to the same frame in the sequence, while FIGS. 16C-16F refer to another frame in the sequence.

FIG. 16E shows the estimated location of the local region after taking into account movement by the object in accordance with various embodiments.

FIG. 16F shows the outer boundary of the local region in accordance with various embodiments.

FIG. 18A represents a current frame in the frame sequence.

FIG. 18B represents another frame in the frame sequence.

FIG. 18C illustrates how the relocated local region corresponding to a portion of the object is still shown at the same relative location even though the portion of the object is now obstructed

FIGS. 20A-F illustrate execution of a testing algorithm using a test frame for automatically identifying local regions according to various embodiments, where FIG. 20A depicts a selected base frame.

FIG. 20B depicts a test frame, where the object of interest moves towards the right in a downward direction.

FIG. 20C illustrates arrows that represent the estimated movement by the object, where each arrow shows both the estimated direction of movement and the magnitude of a region in the frame.

FIG. 20D illustrates how the obtained contour is modified to the reference contour based on the motion information.

FIG. 20E illustrates how the tracking algorithm is then applied to the test frame to derive the estimated contour.

FIG. 20F illustrate how various local regions are lost in the estimated contour.

FIG. 21A shows a contour specified by the user around the object of interest in an initial frame.

FIG. 21B shows the object mask representation of the object region in FIG. 21A.

FIG. 21C shows the object mask comprising the tracking result.

FIG. 21D illustrates how upon discarding the small changes, two main regions are identified in accordance with various embodiments.

DETAILED DESCRIPTION

Object tracking is a commonly-used technique used for video editing that allows a user to select an object of interest in a video and track the contour of the object in every video frame. The tracking result can be used to adjust the color or brightness of the object or compose the object with the scenes in other videos. In order to produce high-quality video editing results, an object tracking method should precisely estimate the contour of the object. However, the tracking results may sometimes yield erroneous results. For example, a portion of the object may be inadvertently excluded from the estimated contour.

Since the object tracking process has temporal dependency, an erroneous tracking result will easily lead to a series of erroneous results. The user can manually refine the tracking result on a frame-by-frame basis where the tracking algorithm resumes processing based on the refined result. However, it can be difficult to precisely track an object in some video scenes. For example, if a portion of the object is very similar in color to the background region, this can case erroneous results. In such cases, the tracking algorithm may constantly generate erroneous results, thereby relying on the user to constantly refine the tracking result. This can be a tedious and time-consuming process.

Various embodiments are disclosed that improve the quality of result producing during the object tracking process to yield more accurate results, thereby reducing the amount of user input for refining the tracing result. For some embodiments, a basic object tracking algorithm is implemented, and an object shape editor allows the user to refine the tracking result. The system further comprises a mechanism for adjusting the tracking algorithm based on the user refinement input, where the user refinement input includes, but is not limited to, the addition of local regions and/or the removal of other local regions.

Figure 4A:
FIG. 4A illustrates selection of an object by a user using a selection tool in a first frame.
Figure 4B:
FIGS. 4B-4E illustrate the object in succeeding frames.
Figure 4C:
Figure 4D:
Figure 4E:
Figure 4F:
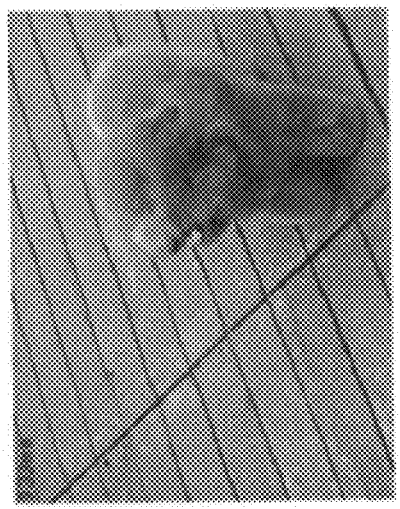
FIG. 4F illustrates modification of the object based on the estimated contour.

FIGS. 4A-F illustrate an example application in which object tracking is utilized. In FIG. 4A, the user selects or defines the contour of the object (i.e., the dog shown) using a selection tool such as brush tool as represented by the cursor tool shown. The contour drawn around the object is represented by the outline surrounding the object. For the video frames that follow, as shown in FIGS. 4B-E, the object tracking algorithm estimates the contour of the object on a frame-by-frame basis as the object moves and as the shape of the object changes. The object tracking results across the series of frames can then be utilized for editing purposes. As illustrated in FIG. 4F, the object may be modified (e.g., color change) based on the estimated contour without modifying any of the other regions in the frame. In this regard, accurate object tracking is needed to facilitate video editing operations.

Figure 1:
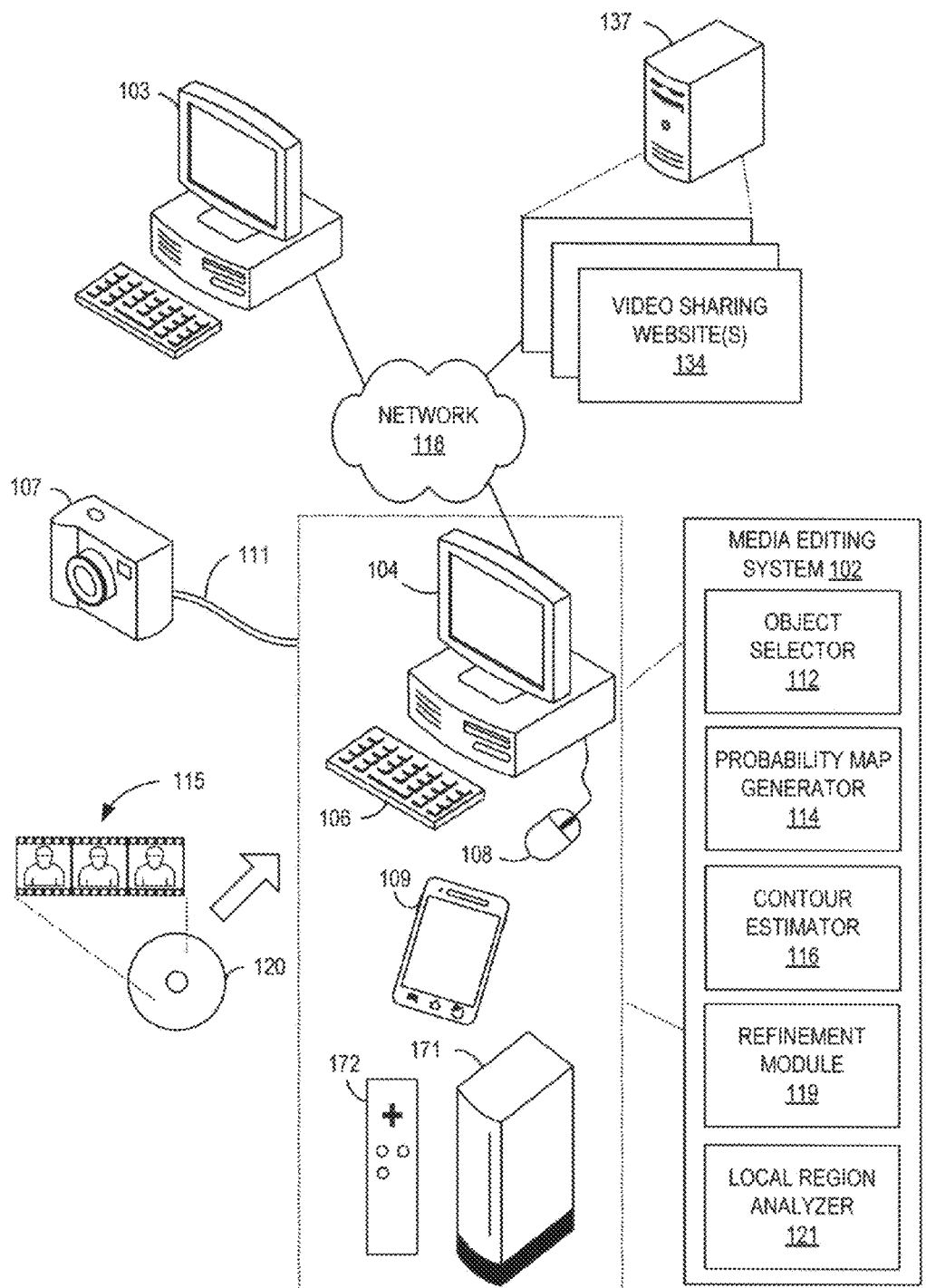
FIG. 1 is a block diagram of a video editing system for facilitating object tracking in accordance with various embodiments of the present disclosure.

A description of a system for facilitating object tracking is now described followed by a discussion of the operation of the components within the system. FIG. 1 is a block diagram of a media editing system 102 in which embodiments of the object tracking techniques disclosed herein may be implemented. The media editing system 102 may be embodied, for example, as a desktop computer, computer workstation, laptop, a smartphone 109, a tablet, or other computing platform that includes a display 104 and may include such input devices as a keyboard 106 and a mouse 108.

For embodiments where the media editing system 102 is embodied as a smartphone 109 or tablet, the user may interface with the media editing system 102 via a touchscreen interface (not shown). In other embodiments, the media editing system 102 may be embodied as a video gaming console 171, which includes a video game controller 172 for receiving user preferences. For such embodiments, the video gaming console 171 may be connected to a television (not shown) or other display 104.

The media editing system 102 is configured to retrieve digital media content 115 stored on a storage medium 120 such as, by way of example and without limitation, a compact disc (CD) or a universal serial bus (USB) flash drive, wherein the digital media content 115 may then be stored locally on a hard drive of the media editing system 102. As one of ordinary skill will appreciate, the digital media content 115 may be encoded in any of a number of formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), or any number of other digital formats.

As depicted in FIG. 1, the media editing system 102 may also be configured to retrieve digital media content 115 directly from a digital camera 107 where a cable 111 or some other interface may be used for coupling the digital camera 107 to the media editing system 102. The media editing system 102 may support any one of a number of common computer interfaces, such as, but not limited to IEEE-1394 High Performance Serial Bus (Firewire), USB, a serial connection, and a parallel connection.

The digital camera 107 may also be coupled to the media editing system 102 over a wireless connection or other communication path. The media editing system 102 may be coupled to a network 118 such as, for example, the Internet, intranets, extranets, wide area networks (WANs), local area networks (LANs), wired networks, wireless networks, or other suitable networks, etc., or any combination of two or more such networks. Through the network 118, the media editing system 102 may receive digital media content 115 from another computing system 103. Alternatively, the media editing system 102 may access one or more video sharing websites 134 hosted on a server 137 via the network 118 to retrieve digital media content 115.

The object selector 112 in the media editing system 102 is configured to obtain an object contour selection from the user of the media editing system 102, where the user is viewing and/or editing the media content 115 obtained by the media editing system 102. For some embodiments, the contour input by the user is serves as a reference contour where a local region is derived for purposes of refining subsequent contour estimations, as described in more detail below.

The probability map generator 114 is configured to generate a plurality of probability maps containing probability values for each pixel for a current frame. For some embodiments, two probability maps are generated where the first probability map comprises a color model map and the second probability map comprises an edge map. The probability value of each pixel in the first probability map corresponds to a likelihood of the pixel being located within the contour, and the probability value of each pixel in the second probability map corresponds to a likelihood of the pixel being located at the boundary of the contour. The computation of probability values is generally based on the obtained contours of the object in the previous frames. The contours may include the initial contour input by the user or the contour in a previous frame derived as a result of the tracking process.

The contour estimator 116 is configured to estimate a contour on a frame-by-frame basis for the object being tracked, where the estimation is performed based on the probability maps output by the probability map generator 114. The refinement module 119 is configured to obtain user input for refining the estimated contour as needed. For some embodiments, the refinement module 119 obtains the user input via a user interface displayed to the user, where the user interface includes a selection component that allows the user to refine the contour of the object of interest.

The local region analyzer 121 is configured to analyze the contour refined by the user and compare the refined contour to the estimated contour prior to refinement by the user. Based on the difference between the two contours, the local region analyzer 121 identifies one or more local regions added to the estimated contour, one or more local regions removed from the estimated contour, and/or a combination of the two.

The probability map generator 114 then makes adjustments based on the one or more identified local regions and updated probability maps are generated, where emphasis is placed on the pixels corresponding to the one or more identified local regions. The next frame in the video sequence is then processed and an estimated contour is again generated. The operations performed by the components above are repeated until all the frames in the video sequence are processed.

Figure 2:
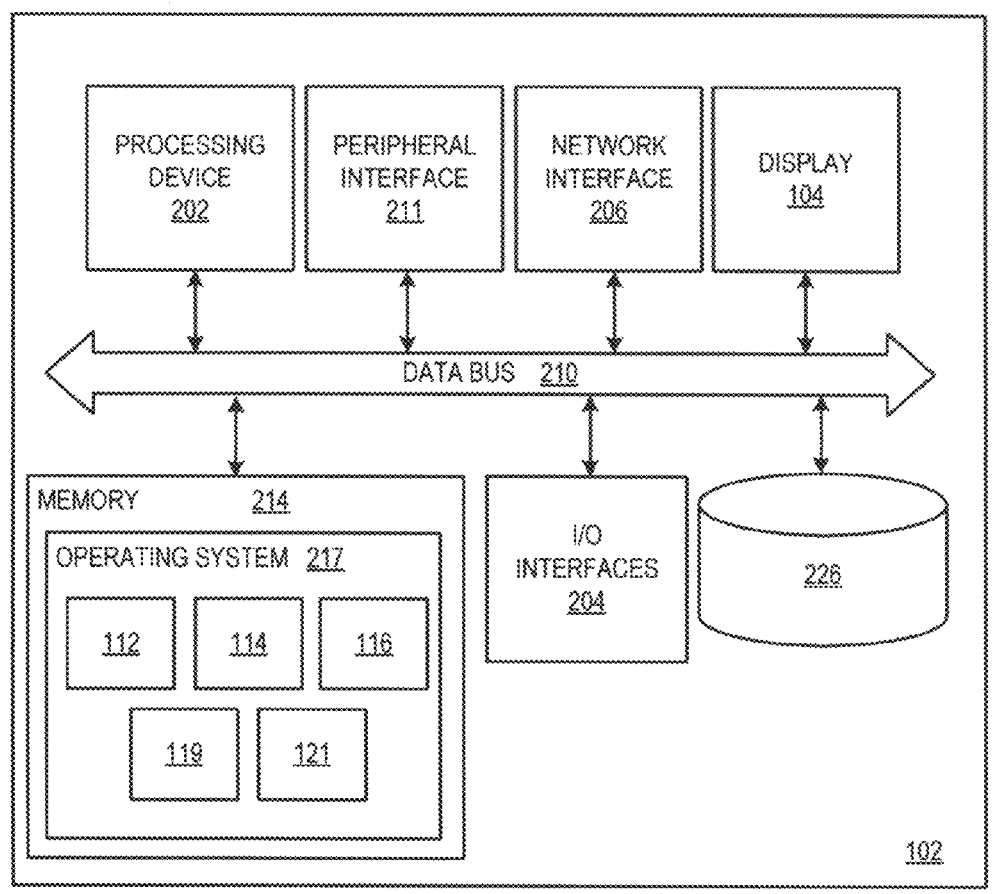
FIG. 2 is a detailed view of the video editing system of FIG. 1 in accordance with various embodiments of the present disclosure.

Reference is made to FIG. 2, which is a schematic diagram of the media editing system 102 shown in FIG. 1. The media editing system 102 may be embodied in any one of a wide variety of wired and/or wireless computing devices, such as a desktop computer, portable computer, dedicated server computer, multiprocessor computing device, smartphone 109 (FIG. 1), tablet computing device, and so forth. As shown in FIG. 2, the media editing system 102 comprises memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the media editing system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 217, one or more native applications, emulation systems, or emulated applications for any of a variety of operating systems and/or emulated hardware platforms, emulated operating systems, etc.

The applications may include application specific software which may comprise some or all the components (object selector 112, probability map generator 114, contour estimator 116, refinement module 119, and local region analyzer 121) of the media editing system 102 depicted in FIG. 1. In accordance with such embodiments, the components are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the media editing system 102 comprises a personal computer, these components may interface with one or more user input devices via the I/O interfaces 204, where the user input devices may comprise a keyboard 106 (FIG. 1) or a mouse 108 (FIG. 1). The display 104 may comprise a computer monitor, a plasma screen for a PC, a liquid crystal display (LCD), a touchscreen display, or other display device 104.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The media editing system 102 may communicate with one or more computing devices via the network interface 206 over the network 118 (FIG. 1). The media editing system 102 may further comprise mass storage 226. The peripheral interface 211 supports various interfaces including, but not limited to IEEE-1394 High Performance Serial Bus (Firewire), USB, a serial connection, and a parallel connection.

Figure 3:
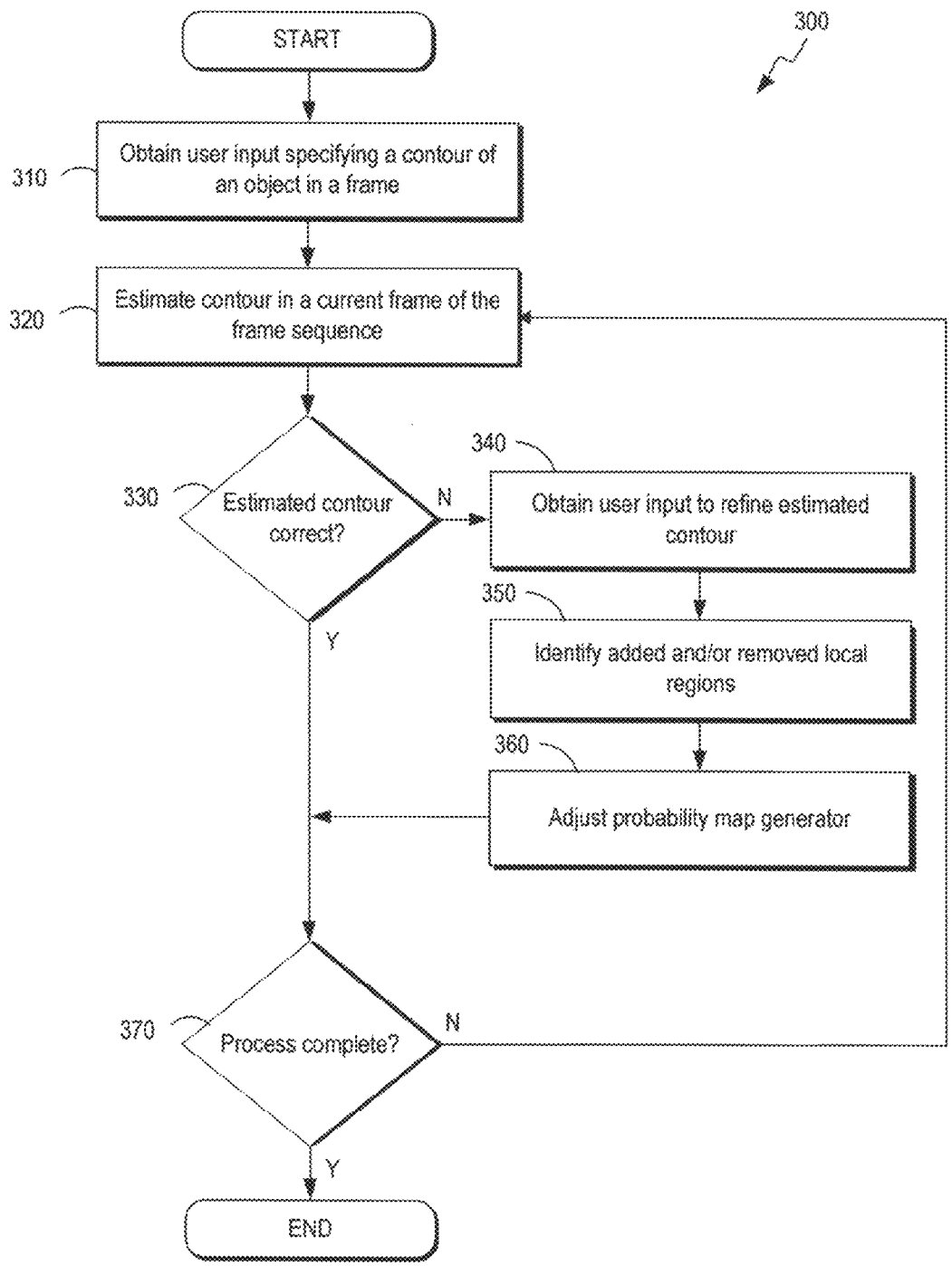
FIG. 3 is a top-level flowchart illustrating examples of functionality implemented as portions of the video editing system of FIG. 1 for facilitating object tracking according to various embodiments of the present disclosure.

Reference is made to FIG. 3, which is a flowchart 300 in accordance with one embodiment for facilitating object tracking performed by the media editing system 102 of FIG. 1. It is understood that the flowchart 300 of FIG. 3 provides merely an example of the many different types of functional arrangements that may be employed to implement the operation of the various components of the media editing system 102 (FIG. 1). As an alternative, the flowchart of FIG. 3 may be viewed as depicting an example of steps of a method implemented in the media editing system 102 according to one or more embodiments.

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

Beginning with block 310, the object selector 112 (FIG. 1) obtains user input specifying a contour of an object of interest in a frame of a video sequence, where the user wishes to track the object. In block 320, the contour estimator 116 estimates the contour of the object in a current frame of the sequence. For some embodiments, the contour of the object is estimated using one or more probability maps generated by the probability map generator 114 (FIG. 1).

In decision block 330, if the estimated contour is not correct, the refinement module 119 obtains user input to refine the estimated contour (block 340). In block 350, the local region analyzer 121 (FIG. 1) identifies one or more local regions to either be added and/or removed. In block 360, the probability map generator 114 is adjusted where emphasis is placed on the identified local regions when updated probability maps are generated. The flow then proceeds to decision block 370. Returning back to decision block 330, if the estimated contour is correct and does not need to be refined, then in decision block 370, a determination is made on whether the tracking process is complete. Specifically, if the user elects to stop the tracking process or if all the frames in the video sequence have been processed, then the tracking process is complete. If the process is not complete, then the flow proceeds back to block 320. It should be emphasized that the next frame in the video sequence is not limited to the frame immediately following the previous frame that was processed.

Figure 5:
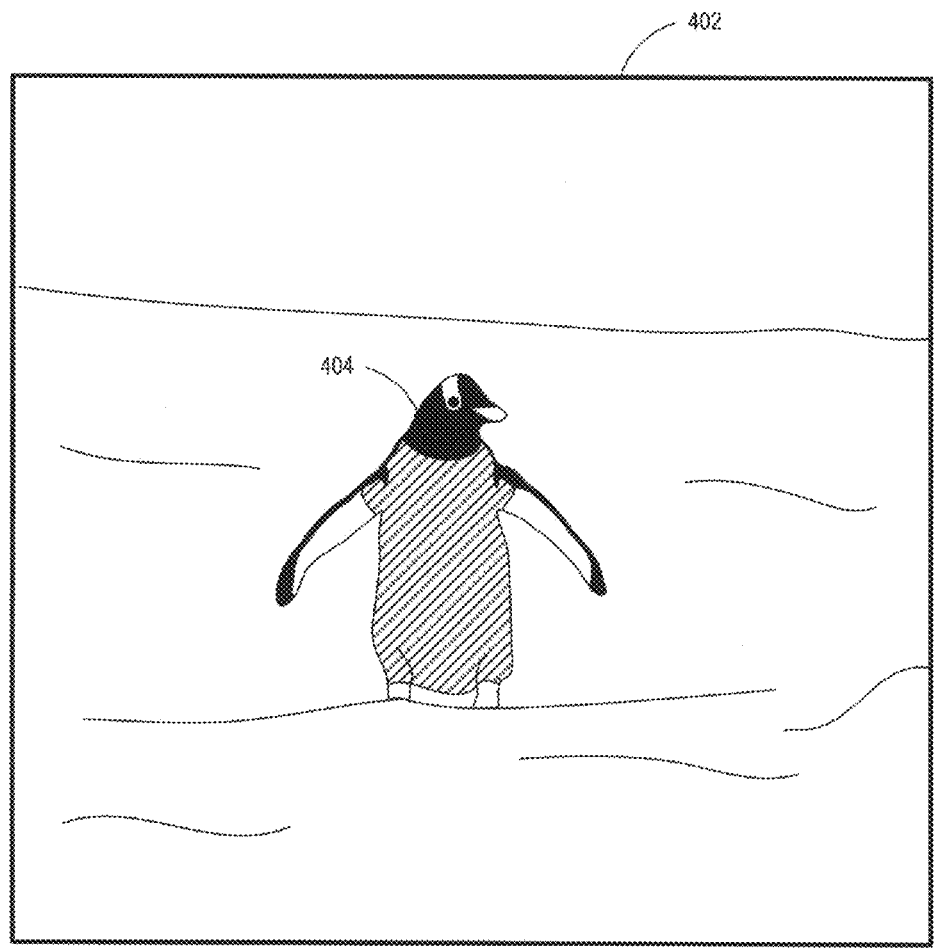
FIG. 5 is an example of a video frame to be processed by the video editing system of FIG. 1 in accordance with various embodiments of the present disclosure.
Figure 6:
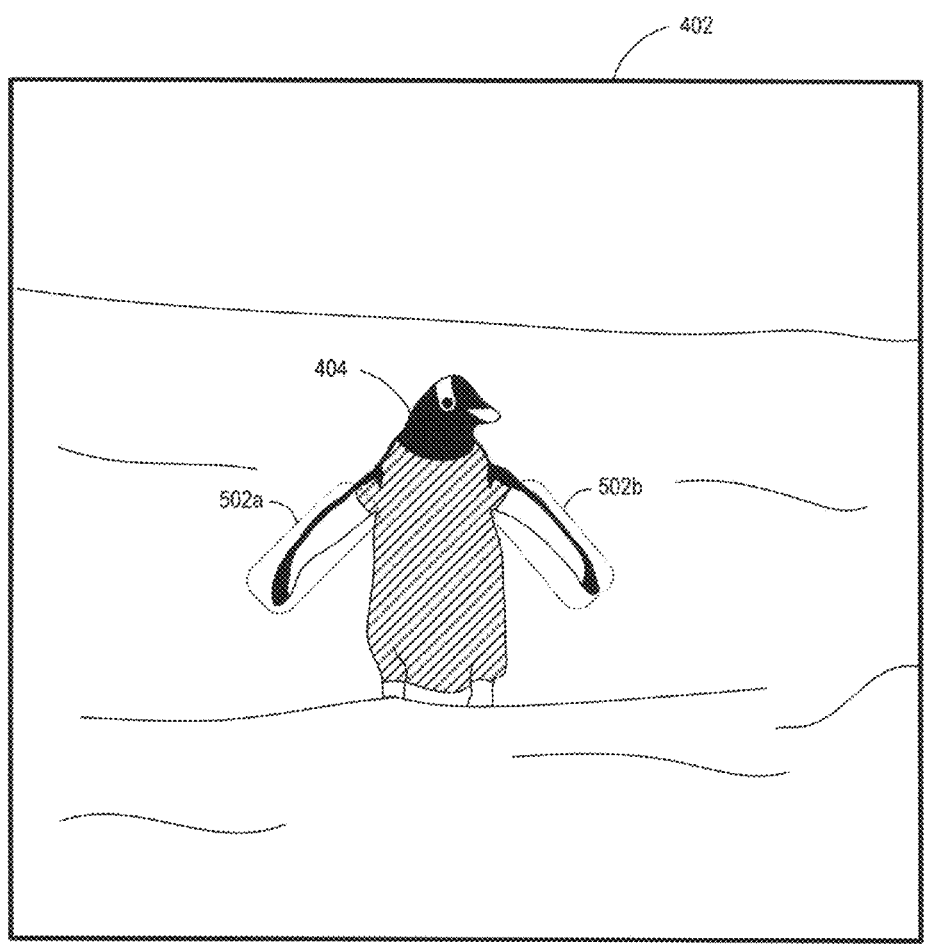
FIGS. 6 and 7 illustrate thin regions of an object to be tracked by the video editing system of FIG. 1 in accordance with various embodiments of the present disclosure.

To further illustrate the concept of local regions, reference is made to FIG. 5, which depicts an object 404 of interest (i.e., a penguin) in a frame 402, where the user wishes to track the object 404. As shown, the object 404 includes various elements/regions (e.g., the flippers) which vary in size, shape, color, etc. As shown in FIG. 6, the object 404 includes various elements or regions that blend in with the background, thereby resulting in "thin" regions 502a, 502b that correspond to the thin portions of the elements that are in contrast with the background of the image in the frame 402.

Figure 7:
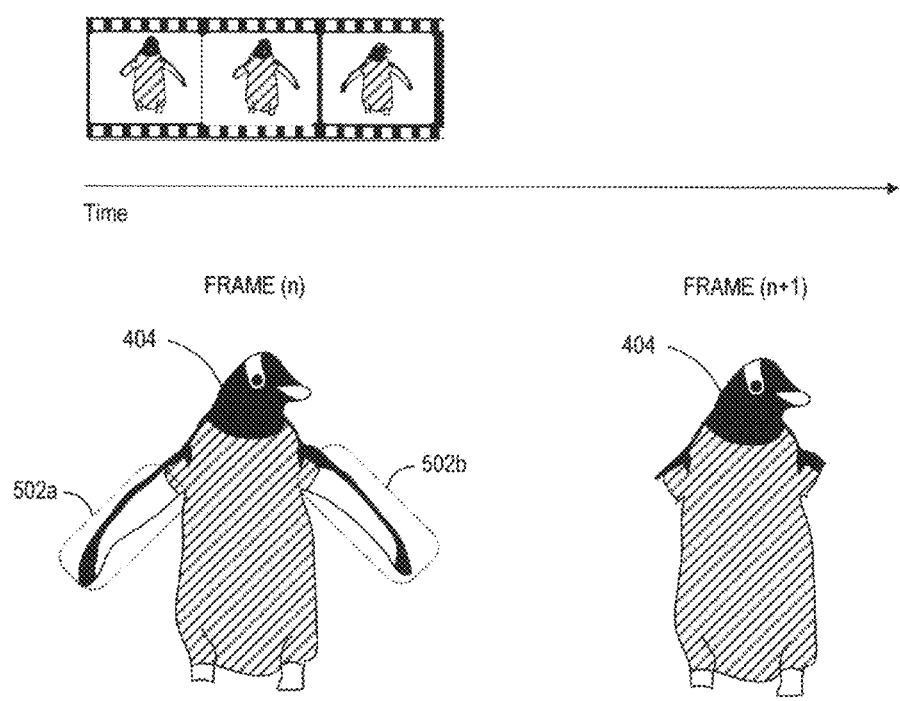
Figure 8:
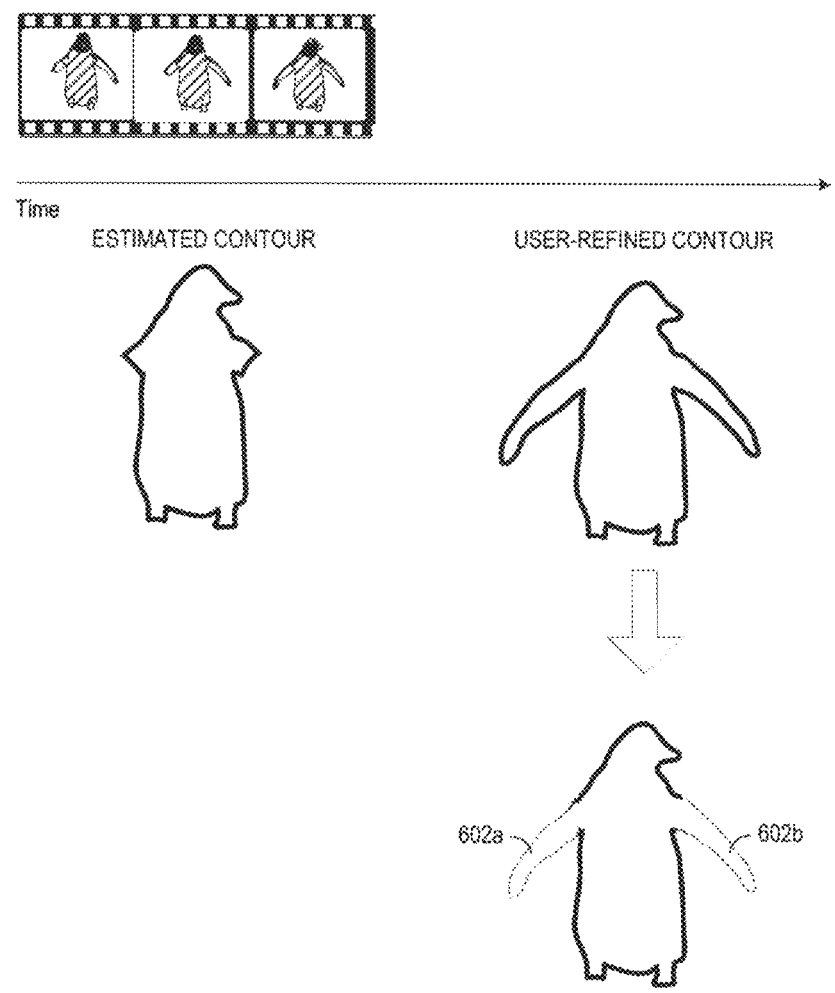
FIG. 8 illustrates the identification of local regions by the video editing system of FIG. 1 in accordance with various embodiments of the present disclosure.

In the example shown in FIG. 7, the thin regions 502a, 502b are lost during the tracking process. FIG. 8 illustrates an estimated contour generated by the contour estimator 116 (FIG. 1). As shown, the estimated contour is missing portions of the object. The user corrects the erroneous contour estimation and adds the missing portions of the object to the contour, as shown by the user-refined contour. The local region analyzer 121 (FIG. 1) then identifies the portions added by the user as local regions 602a, 602b, which are then used to adjust the probability maps output by the probability map generator 114.

Figure 9:
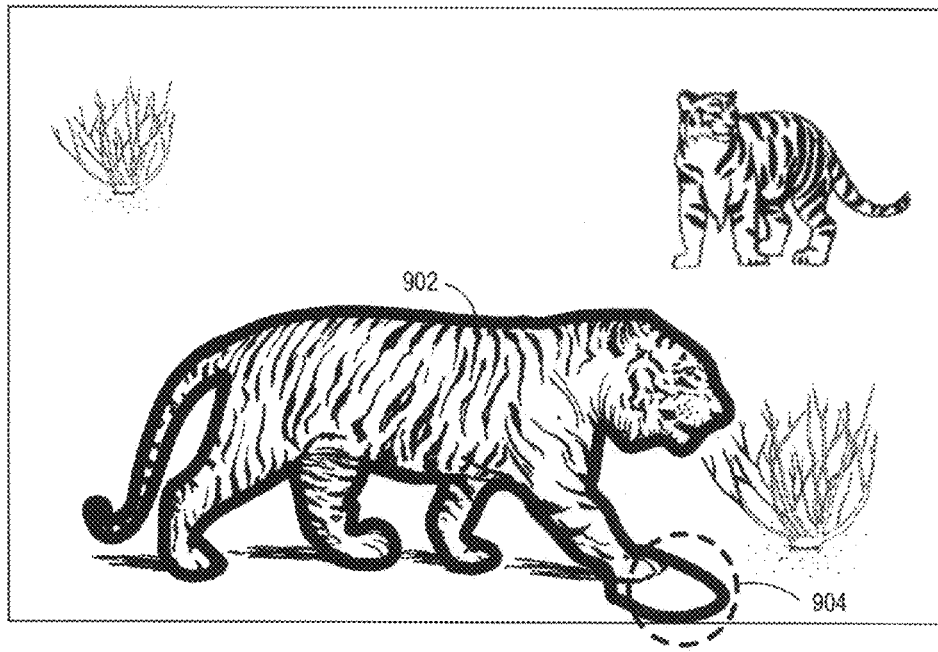
FIG. 9 is an example where a region outside the object is erroneously included as part of the estimated contour.
Figure 10:
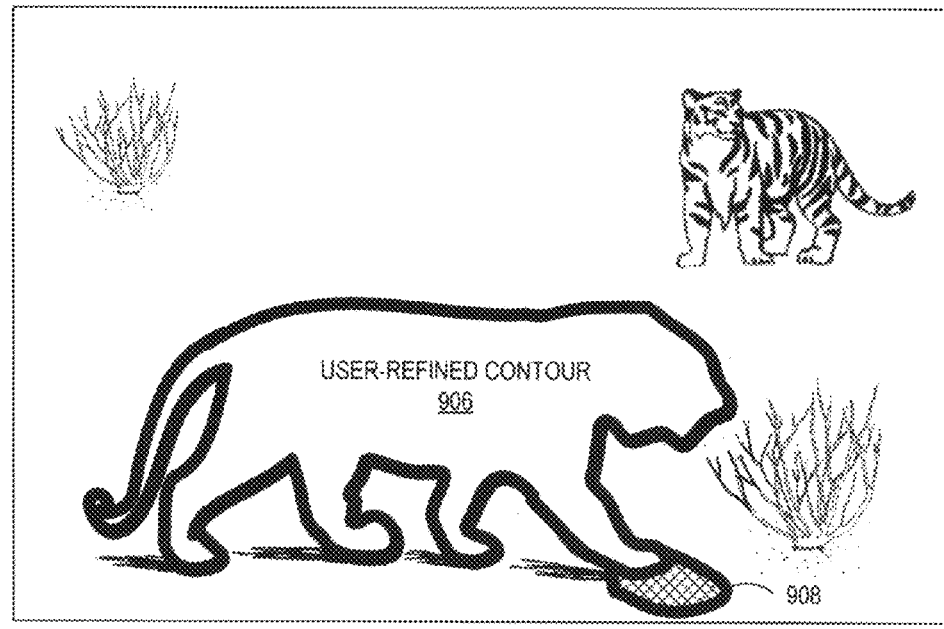
FIG. 10 illustrates the contour refined by the user, where the region is excluded from the contour estimation.

FIG. 9 is an example where the contour estimator 116 (FIG. 1) generates a contour estimation 902 where a region 904 outside the object is erroneously included as part of the estimated contour 902. FIG. 10 illustrates the contour 906 refined by the user, where the region 908 is excluded from the user-refined contour 906. The local region analyzer 121 (FIG. 1) identifies the portion removed by the user as a local region 908 for purposes of adjusting the probability map generator 114 (FIG. 1).

FIGS. 11A-11D further illustrate an example of erroneous tracking results produced by conventional tracking means. In the example shown, the tracked object is an individual, and the contour specified by the user is shown in FIG. 11A. The tracking algorithm is applied to several successive frames and generates the object contour shown in FIG. 11B. As shown, the contour erroneously omits a portion of the individual's hair (the region shown by the arrow) due to the similarity in color with the background. The user may refine the object contour to its correct shape, where refinement of the contour is shown in FIG. 11C. The tracking algorithm then resumes the tracking process again using the refined object contour. However, after additional successive frames, many conventional tracking algorithms will continue to produce an erroneous result at the same location as before, as shown in FIG. 11D.

Thus, in some scenarios, the user will have to constantly refine or correct the erroneous contour estimation produced by conventional tracking algorithms. This can be a tedious and time-consuming process for the user. Various embodiments are disclosed for receiving user input for refining estimated contours. However, once the user makes such a refinement, the object tracking system adapts the tracking algorithm based on the refinement input from the user, thereby avoiding the need for the user to constantly refine the estimated contour. Each time the user refines the estimated contour, the object tracking system compares the old (erroneous) object region with the new refined (corrected) object region, and determines one or more local regions based on the difference of the erroneous object region and the corrected object region. If a local region is added to the object after the refinement (based on the determined difference), the tracking algorithm places high priority on including the local region(s) as part of the tracking result. On the other hand, if a local region(s) is removed from the object, the tracking algorithm places high priority on excluding the local region(s) from the tracking result.

Figures 12A, 12B, 12C:
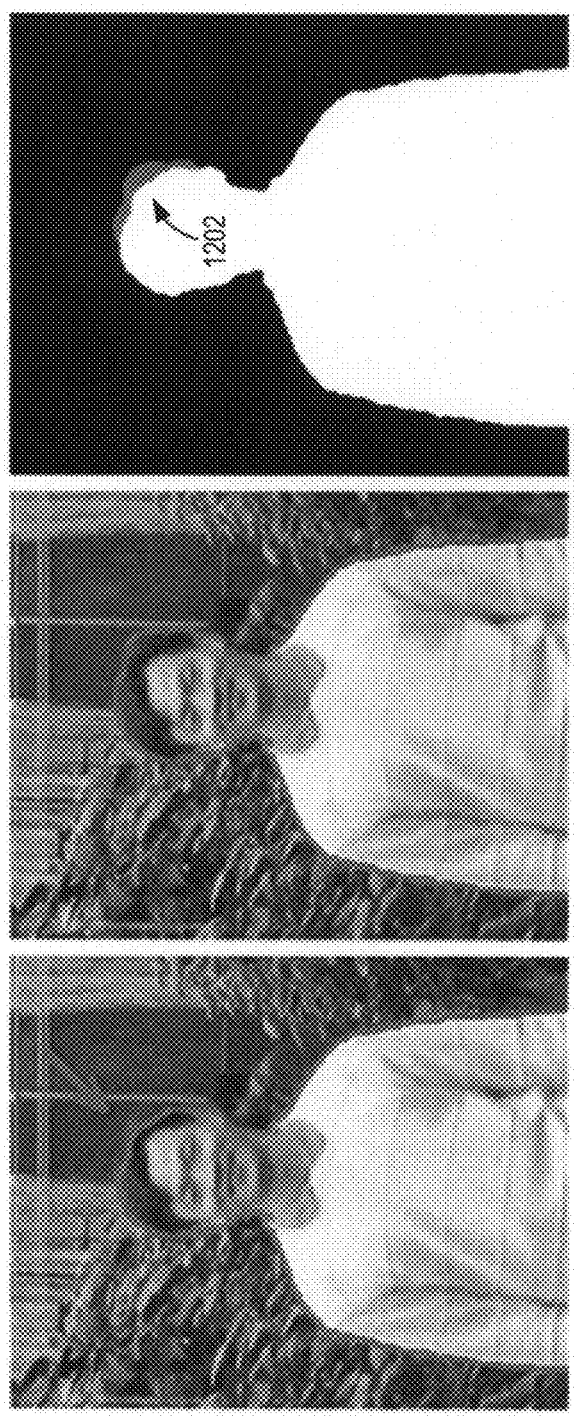
FIG. 12A illustrates an erroneous object contour.
FIG. 12B illustrates a user refined contour.
FIG. 12C illustrates how a local region is derived in accordance with various embodiments.

FIG. 12A-12C illustrate construction of a local region. An erroneous object contour is shown in FIG. 12A, and the user refined contour is shown in FIG. 12B. The difference between the two contours is shown in FIG. 12C, where the local region 1202 added by the user is shown in highlighted. In accordance with various embodiments, when the object tracking system determines the local region, the system adapts the tracking algorithm to track the object based on the user's refinement of the object contour. Although different tracking algorithms use different criteria to find the object contour, the user refinement information can be leveraged in the following ways described below.

Figure 13:
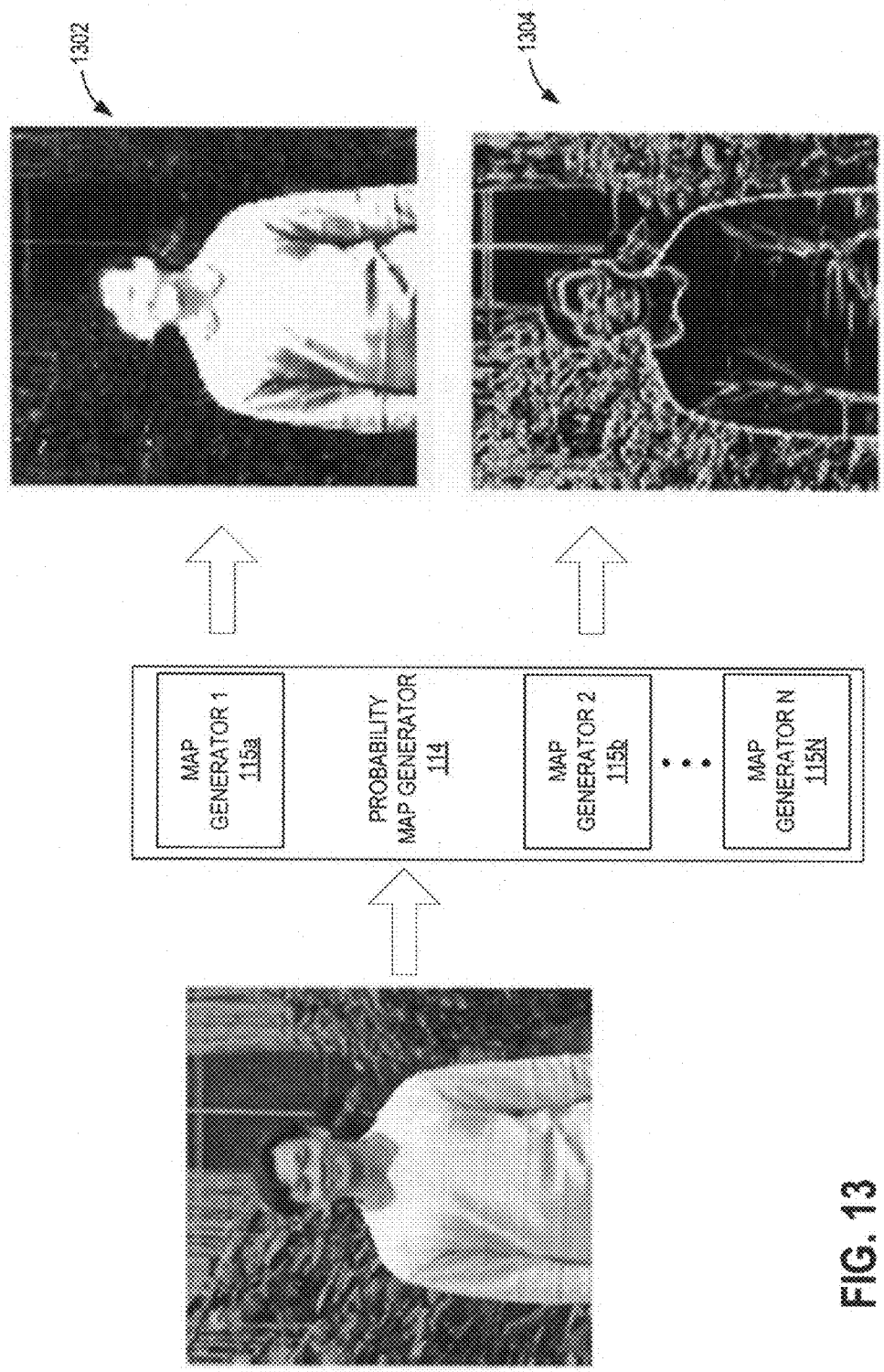
FIG. 13 is an example of probability maps derived based on color model and edge presence in accordance with various embodiments.

Reference is made to FIG. 13, which is an example of the two probability maps derived based on color model and edge presence. A single frame within a video sequence is shown during the tracking process. For some embodiments, the probability map generator 114 comprises a plurality of map generators 115, where each map generator 115 is configured to generate a different probability map. While FIG. 13 illustrates the construction of two probability maps, it should be noted that embodiments of the probability map generator 114 is not limited to only two map generators 115 and additional map generators 115 may be implemented, as shown. The probability map generator 114 constructs a foreground model according to the contour in a prior frame and constructs a background model according to a region other than the contour in a same or different prior frame.

A color model of the target is then constructed while tracking is initiated, and the first map generator 115a constructs a probability map 1302 based on the color of every pixel in the frame. In the first probability map 1302 shown, the brighter region(s) represents a higher probability of the pixel belonging to the tracking result. In the map shown, the primary colors of the target (the color of the individual's clothing and the skin color of the individual) have a higher probability of belonging to the tracking result. However, the hair color tends to blend in with parts of the background and is therefore assigned lower probability values.

The probability map 1304 generated by the second probability map generator 115b is derived from the gradient (i.e., difference of adjacent pixels) in the frame. Each value in the second probability map 1304 represents the probability of a pixel being located exactly on the boundary of the tracked object. Again, the brighter region(s) shown in the probability map 1304 represents a higher probability that the pixel is located on the sharp edges as the body shape. However, the edge is not as obvious between the hair and the background, so the probability values are relatively low in this region.

Figure 14:
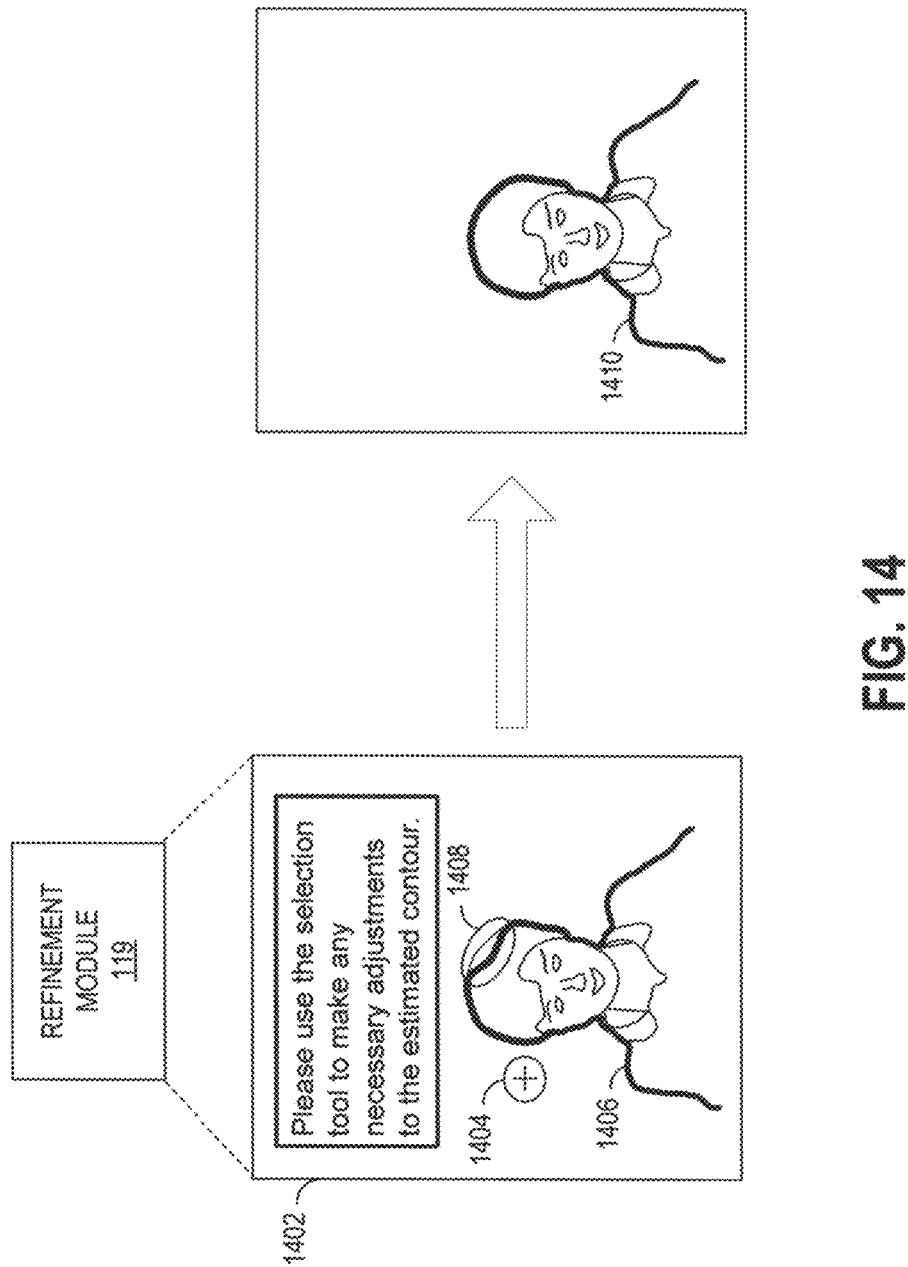
FIG. 14 illustrates the refinement process in accordance with various embodiments.

FIG. 14 illustrates the refinement process in accordance with various embodiments. For some embodiments, the refinement module 119 generates a user interface 1402 displayed to the user, where the user is prompted to use a selection tool 1404 to make any necessary corrections to the estimated contour 1406. In the example shown, the estimated contour 1406 is missing a portion 1408 of the individual's head. The user makes the necessary adjustment so that a refined estimated contour 1410 is generated.

Figure 15:
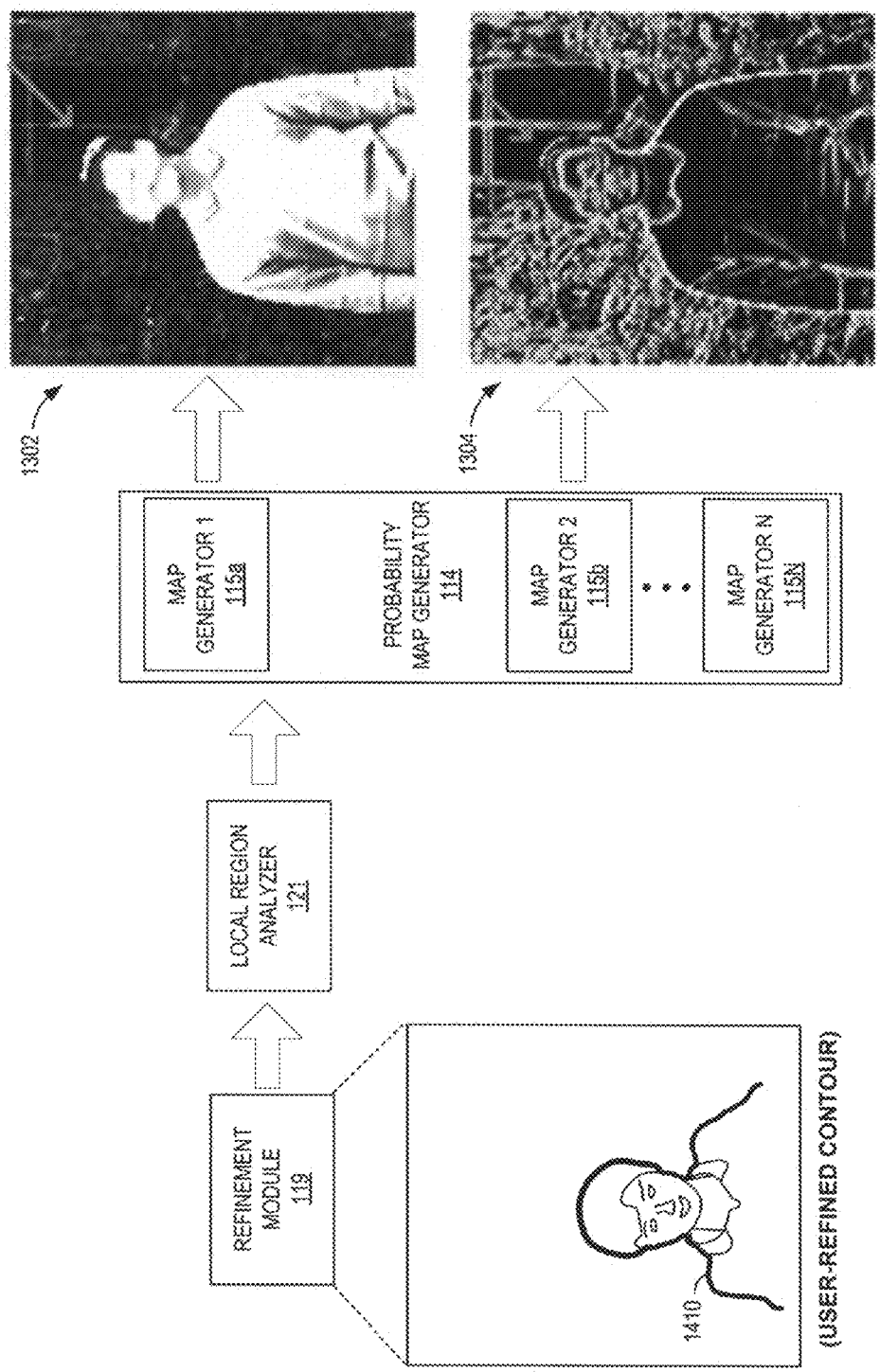
FIG. 15 illustrates adjustment of the probability map generator in accordance with various embodiments.

Reference is made to FIG. 15, which illustrates adjustment of the probability map generator 114. As shown, the user-refined contour 1410 is obtained by the refinement module 119 and forwarded to the local region analyzer 121, which then identifies the local region added by the user. The results from the local region analyzer 121 are forwarded to the probability map generator 114, which then adjusts the corresponding map generators 115.

For some embodiments, adjusting the map generators 115 comprises configuring each map generator to generate higher probability values corresponding to the pixels within any local regions that are added and configuring the probability map generator to generate lower probability values corresponding to the pixels within any local regions that are removed.

As shown, the probability values of the pixels in the local region are increased in the first probability map 1302, as shown by the arrow, due to the addition of a local region. Similarly, the probability values of the pixels along the boundary of the local region are increased for the second probability map 1304, as shown by the arrow. The amount in which each probability value is increased is a parameter of the object tracking algorithm. The contour estimator 116 (FIG. 1) then uses the adjusted probability maps to generate a new estimated contour, which should now include the entire object. For some embodiments, the user refinement is performed on one of the previous frames, so the information can be stored and used to help the tracking algorithm in the following frames.

In general, the probability map generator 114 estimates the probabilities of the pixels in the video frame, and determines a most probable contour based on the probabilities. For a local region added by the user, the probabilities of pixels being in the region are raised such that the contour is more likely to be included the estimated contour. For a local region removed by the user, the probabilities of pixels being in the region are decreased in order to increase the likelihood of being excluded from the estimated contour.

The contours of the local regions provide valuable information to the contour estimator 116. The contour estimator 116 typically attempts to locate the contour on the strong edges in the frame since the contour of an object usually has strong edges. However, this is also why the object tracking algorithm produces erroneous results when similar colors exist between the object and the background. When the user refinement changes the object contour, the new contour is treated as a strong edge, since it is the user-expected object contour.

For some embodiments, the contour estimator 116 estimates the contour of the object based on the plurality of probability maps by selecting a contour as the estimated contour based on a contour with the highest contour score. Each contour score is calculated according to at least one of the following: 1) a total length of a contour boundary, where a higher contour score is assigned in response to a total length of the contour boundary being shorter; 2) the probability values of the pixels in the frame within the contour representing a likelihood of being located within the object, where a higher contour score is assigned in response to the probability values being higher; and 3) the probability values of the pixels in the frame on the contour representing a likelihood of being located at the boundary of the object, where a higher contour score is assigned in response to the probability values being higher.

The object tracking techniques disclosed above attempt to adjust the tracking algorithm for frames after the frame in which the user makes the refinement. If the object or the whole scene moves during the transition across frames, the same location cannot be used to represent the local regions. This problem can be addressed by incorporating motion estimation into the tracking algorithm. Reference is made to FIGS. 16A-F, which illustrate the use of motion estimation in the tracking algorithm. A motion estimation module in the contour estimator 116 estimates the movement for each location in the frame based on the content of two video frames. Motion estimation may be used to roughly track the movement of each local region. Thus, before the adjusting the probability map generator 114, the location of the local region(s) is shifted by their estimated movement.

In the example shown, FIGS. 16A and 16B refer to the same frame, while FIGS. 16C to 16F refer to another frame in the sequence. As shown by the varying position of the object in FIGS. 16B and 16C, the tracked object moves in a downward direction to the right. The location of a local region acquired in a previous frame (FIG. 16B) may be erroneous in another frame (FIG. 16D) due to movement by the individual. Thus, for various embodiments, the motion estimation module performs motion estimation to more accurately estimate the location of the local region. FIG. 16E shows the estimated location of the local region after taking into account movement by the object, while FIG. 16F shows the outer boundary of the local region. Information relating to the local region shown in FIG. 16E and FIG. 16F is then used to adjust the probability values in a similar manner as that described in connection with FIG. 15. By more accurately estimating the location of the local region, the contour estimator is able to generate a more accurate estimated contour.

Figure 17:
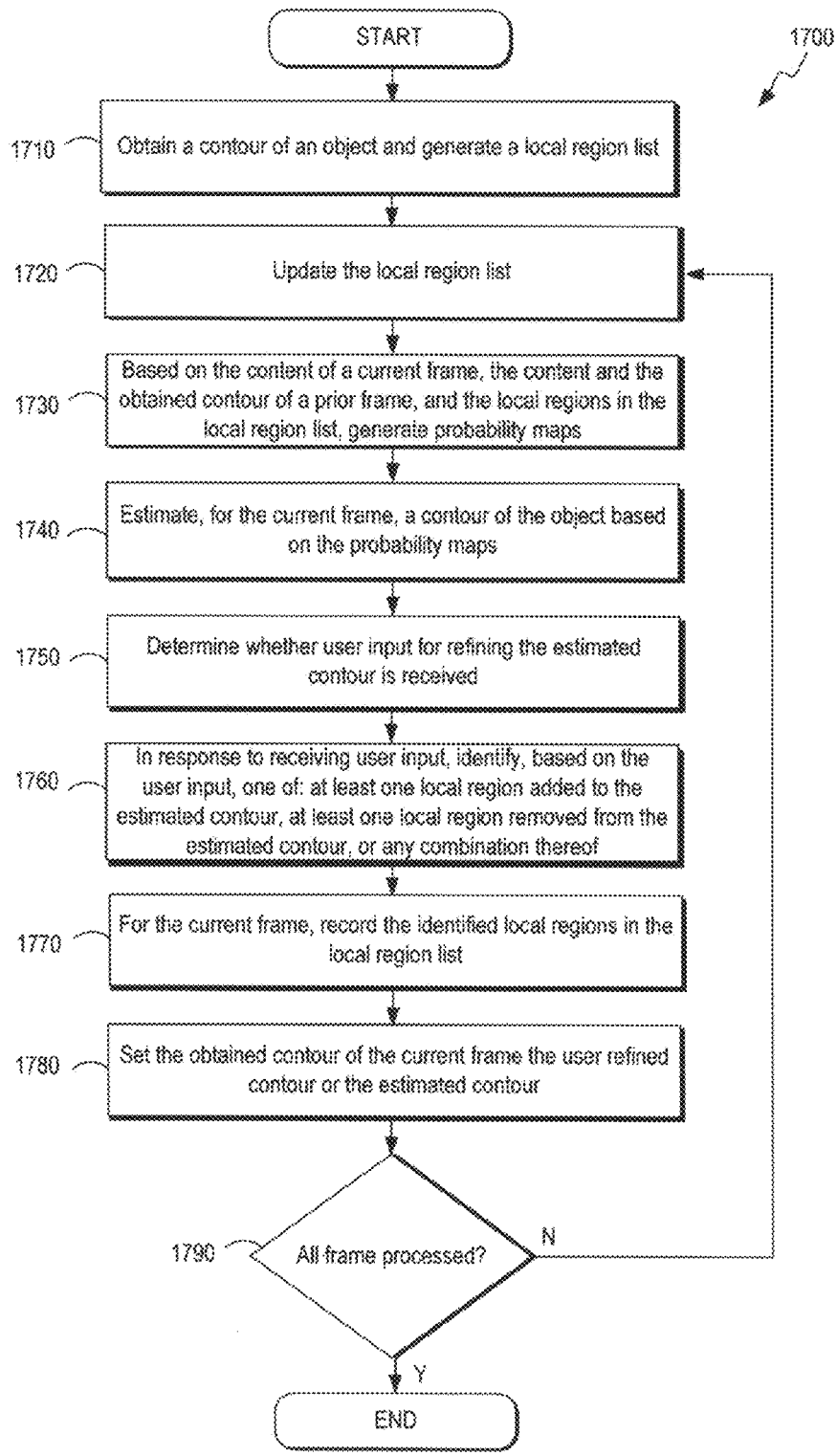
FIG. 17 is a top-level flowchart illustrating examples of functionality implemented as portions of the video editing system of FIG. 1 for facilitating object tracking according to an alternative embodiment of the present disclosure.

Reference is made to FIG. 17, which is a flowchart 1700 in accordance with an alternative embodiment for facilitating object tracking performed by the media editing system 102 of FIG. 1. It is understood that the flowchart 1700 of FIG. 17 provides merely an example of the many different types of functional arrangements that may be employed to implement the operation of the various components of the media editing system 102 (FIG. 1). As an alternative, the flowchart of FIG. 17 may be viewed as depicting an example of steps of a method implemented in the media editing system 102 according to one or more embodiments.

Although the flowchart of FIG. 17 shows a specific order of execution, it is understood that the order of execution may differ from that which is depicted. For example, the order of execution of two or more blocks may be scrambled relative to the order shown. Also, two or more blocks shown in succession in FIG. 17 may be executed concurrently or with partial concurrence. It is understood that all such variations are within the scope of the present disclosure.

Beginning with block 1710, the media editing system 102 obtains a contour of an object and generates a local region list. For each of the remaining frames in the frame sequence, the following operations in blocks 1720 to 1750 are performed. In block 1720, the local region list is updated, and in block 1730, probability maps are generated based on the content of a current frame, the content and the obtained contour of a prior frame, and the local regions in the local region list. In block 1740, a contour of the object is estimated based on the probability maps for the current frame.

In block 1750, a determination is made on whether user input for refining the estimated contour is received. In block 1760, in response to receiving user input, one of the following is identified based on the user input: at least one local region added to the estimated contour, at least one local region removed from the estimated contour, or any combination thereof. In block 1770, for the current frame, the identified local regions in the local region list are recorded, and in block 1780, the obtained contour of the current frame is set to either the user refined contour or to the estimated contour. If all the frames have been processed or if the user elects to stop the tracking process, then the process is complete (decision block 1790).

Figure 18:
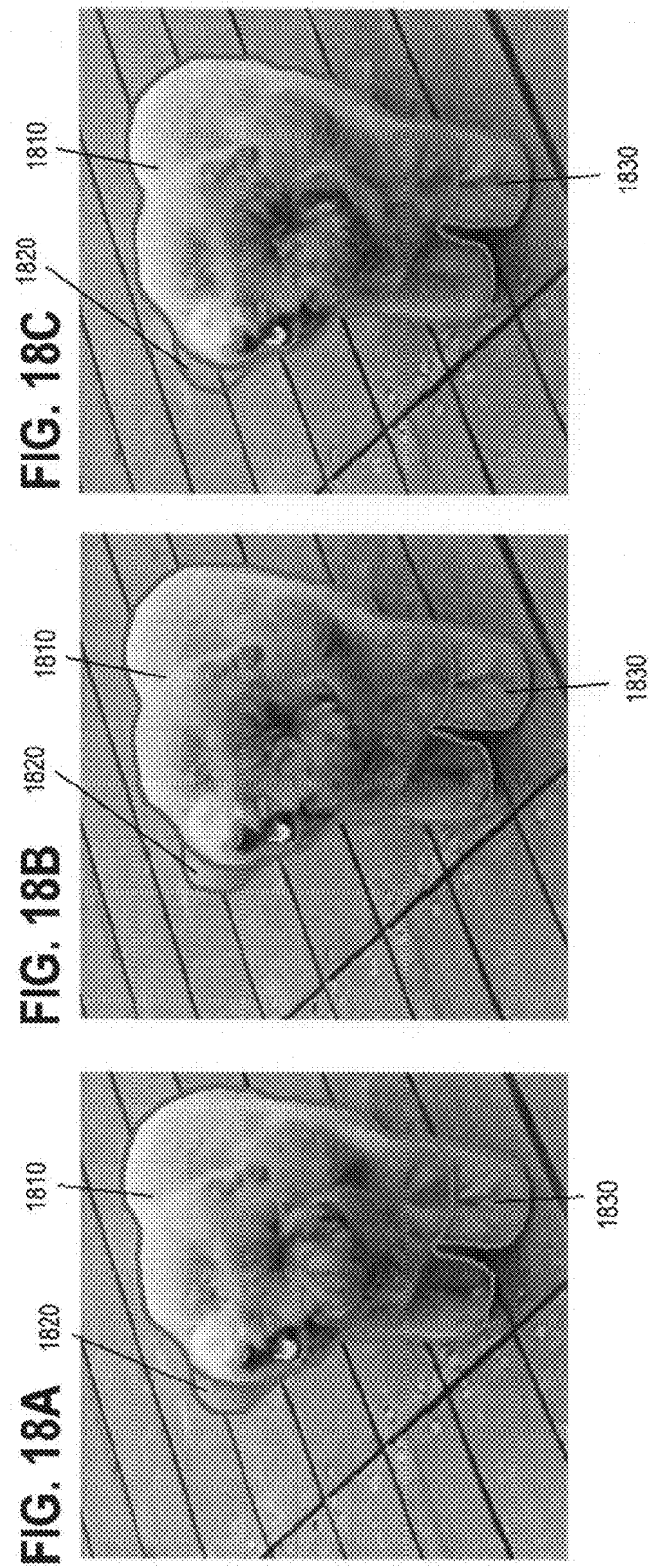
FIGS. 18A-C illustrate the concept of maintaining and updating a local region list according to various embodiments.

Reference is made to FIGS. 18A-C, which illustrate the concept of maintaining and updating a local region list according to various embodiments. As local regions recorded in the local region list are relocated due to movement by the object, adjustment to the probability map generator based on the local regions utilizes the most recent location of the local regions, thereby yielding more accurate tracking results. For some embodiments, the content of a recorded region comprises pixels within the local region. Thus, the content of a previously recorded local region and the content of a local region in the current frame comprise two groups of pixels in different frames and locations.

For comparison purposes, a sum of absolute difference between these two groups of pixels is computed, where a large sum of absolute difference indicates that the content of the recorded local region and the content of the local region of the current frame differ significantly. Thus, if the sum of absolute difference is greater than a threshold, the previously-recorded local region in the local region list is removed from the local region list as the previously-recorded local region is no longer reliable for purposes of adjusting the probability map generator.

Reference is made to FIG. 18A, which represents a current frame in the frame sequence. The object being tracked comprises a dog 1810, where two local regions 1820, 1830 have been identified—one local region 1820 comprising the dog's ear and the other local region 1830 comprising one of the dog's legs. FIG. 18B shows another frame in the frame sequence. As shown relative to the frame in FIG. 18A, the dog 1810 as a whole is moving in a leftward direction. Upon adjusting the position of the local regions 1820, 1830 by performing motion estimation between the frames in FIGS. 18A and 18B, the two local regions 1820, 1830 are still in the same relative location relative to the dog 1810. A comparison between the local region content in FIG. 18A and the local region content in FIG. 18B yields small values for the sum of absolute difference. Due to the small values of the sum of absolute difference the previously-recorded local regions 1820, 1830 are kept in the local region list and are not removed.

In the frame depicted in FIG. 18C, the dog 1810 as a whole is still moving in the same direction. However, in addition to moving in the leftward direction, the dog also turns its head, thereby hiding the right ear, which corresponds to the one of the local regions 1820 previously recorded in the local region list. As shown in FIG. 18C, the relocated local region corresponding to the dog's ear is still shown at the same relative location even though the dog's ear is now obstructed. Thus, the content of the relocated local region corresponds to the background rather than the dog's ear. As the background color is significantly different than the color of the dog, calculating the sum of absolute difference yields a relatively large value. Thus, the previously-recorded local region 1820 corresponding to the dog's ear is no longer considered to be reliable for tracking purposes and is therefore removed from the local region list. Note that in the frame shown in FIG. 18C, the content of the other local region 1830 corresponding to one of the dog's legs is still consistent with the content of the local region 1830 depicted in FIG. 18A. Therefore, that particular local region 1830 is not removed from the local region list.

In accordance with various embodiments, a testing algorithm is executed to automatically identify local regions. The identified local regions are used together with the local regions acquired via user refinement to improve the accuracy of the tracking process. The testing algorithm involves comparing an estimated tracking result with a hypothetical tracking result and then generating local regions according to the comparison. First, a test frame and a base frame are selected where an obtained contour is in the base frame. For various embodiments, the obtained frame may comprise a contour directly input by the user or a previous tracking result that has not been modified by the user. In either case, the object contour is generally considered to be reliable. Next, motion estimation is applied to the test frame and the base frame to estimate movement by the object being tracked. Based on the estimated movement, the shape and location of the obtained contour is adjusted to generate a reference contour, which corresponds to the object contour in the test frame.

The tracking algorithm is then executed on the test frame to estimate the object contour, and the reference contour is compared with the estimated contour to identify the local regions. Local regions that are found in the reference contour but missing in the estimated contour are designated as added local regions, which local regions that are missing from the reference contour but erroneously included in the estimated contour are designated as removed local regions. These identified local regions are recorded in the local region list.

When a local region is acquired in a frame, the location and content of that local region is recorded at that time. The location of the local region may comprise information relating to a point (e.g., mass center) or a bounding rectangle of the region shape. In some embodiments, more detailed information such as the contour of the local region is recorded. The contour represents both the location and the irregular shape of the local region. The local regions previously recorded in the local region list may need to be updated when a new frame is processed.

First, motion estimation is applied to estimate movement of the object between a previous frame and a current frame. The locations of the recorded local regions are then adjusted according to the applied motion information. Motion estimation may generate different motions at different coordinates in the frame, thus the movement of each local region may be different. After the locations of the local regions in the current frame are adjusted, a determination is made on whether the local region is still valid for purposes of adjusting the probability map generator. A local region may be erroneous if the motion estimation yields inaccurate motion information or if the tracked object deforms at that location. To determine whether these conditions exist, the recorded content of local regions recorded in the local region list is utilized as a reference.

For each local region, the content of the local region in the local region list is compared with the content of the local region in the current frame. The content is retrieved within the current location of the local region in the current frame. If the content between the two is significantly different, the local region in the previously-recorded local region is considered unreliable for purposes of adjusting the probability map generator and thus, the unreliable local region recorded in the local region list is removed. In this regard, a local region is not removed from the local region list if the content of the recorded local region in local region list does not differ significantly from the content of the local region in the current frame as each frame in the frame sequence is processed. As such, a testing algorithm may be implemented for various embodiments for purposes of testing the tracking algorithm by comparing the results of the tracking algorithm with a hypothetical result comprising a reference contour and generating local regions based on the comparison, as described in more detail below.

Figure 19:
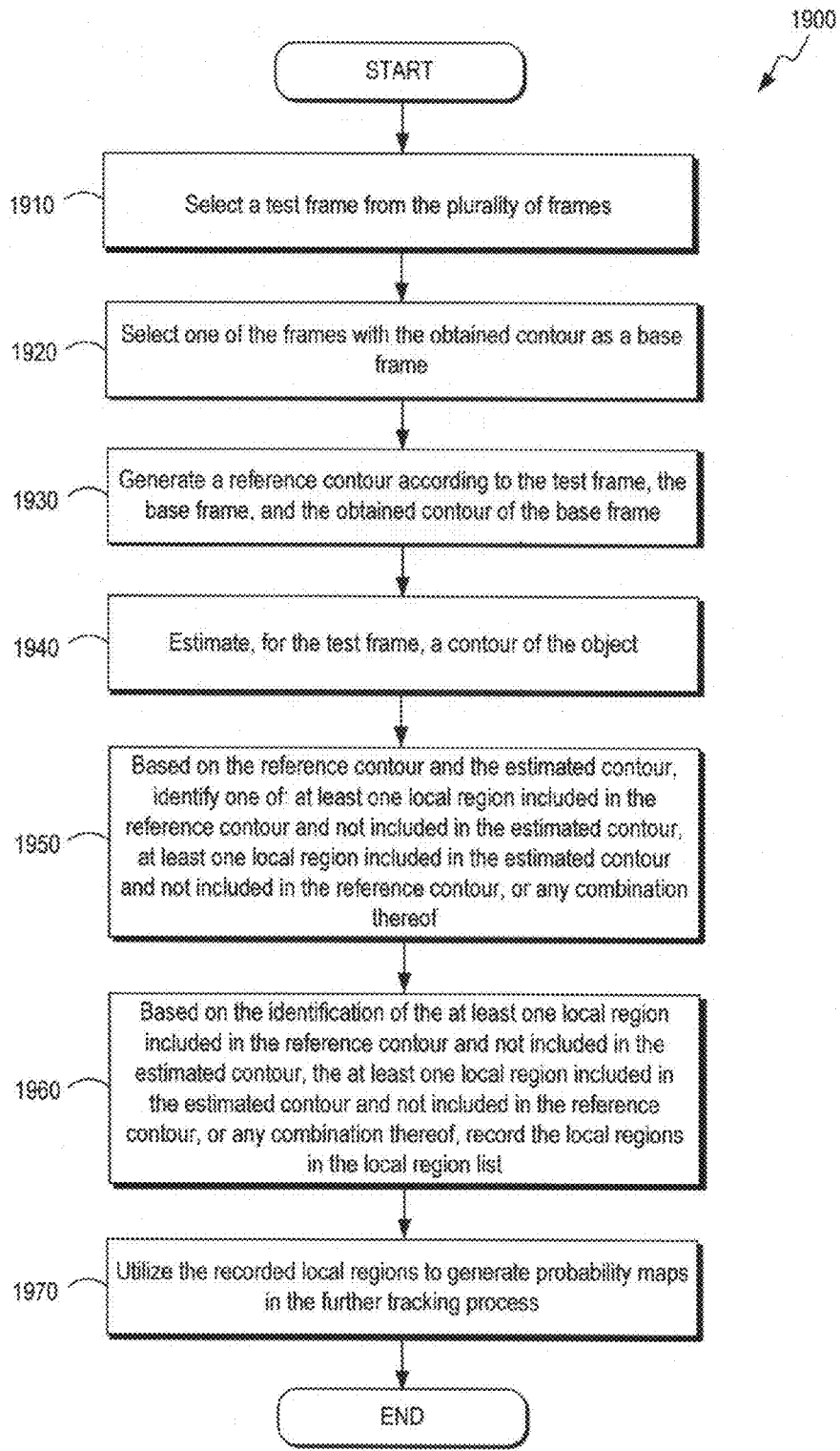
FIG. 19 is a top-level flowchart illustrating a testing algorithm using a test frame according to various embodiments.

FIG. 19 is a flowchart 1900 illustrating a testing algorithm using a test frame. It is understood that the flowchart 1900 of FIG. 19 provides merely an example of the many different types of functional arrangements that may be employed to implement the operation of the various components of the media editing system 102 (FIG. 1). As an alternative, the flowchart of FIG. 19 may be viewed as depicting an example of steps of a method implemented in the media editing system 102 according to one or more embodiments.

Although the flowchart of FIG. 19 shows a specific order of execution, it is understood that the order of execution may differ from that which is depicted. For example, the order of execution of two or more blocks may be scrambled relative to the order shown. Also, two or more blocks shown in succession in FIG. 19 may be executed concurrently or with partial concurrence. It is understood that all such variations are within the scope of the present disclosure.

In block 1910, a test frame is selected from the plurality of frames. In block 1920, one of the frames with the obtained contour is selected as a base frame. In block 1930, a reference contour is generated according to the test frame, the base frame, and the obtained contour of the base frame. In some embodiments, motion estimation is applied to the base frame and the test frame, and the obtained contour is modified to the reference contour according to the motion information. In block 1940, a contour of the object is estimated for the test frame.

In block 1950, based on the reference contour and the estimated contour, one of the following is identified: at least one local region included in the reference contour and not included in the estimated contour, at least one local region included in the estimated contour and not included in the reference contour, or any combination thereof.

In block 1960, based on the identification of the at least one local region included in the reference contour and not included in the estimated contour, the at least one local region included in the estimated contour and not included in the reference contour, or any combination thereof, the local regions are recorded in the local region list. In particular, a local region included in the reference contour is recorded as an added local region, and a local region not included in the reference contour is recorded as a removed local region. In block 1970, the recorded local regions are utilized to generate probability maps in the further tracking process, wherein the local regions are utilized in a manner similar how to the local regions acquired from user input are used.

Reference is made to FIGS. 20A-20F, which further illustrate the testing algorithm described above using a test frame. FIG. 20A depicts a selected base frame where the tracking object is a tiger 2010. An obtained contour 2020 surrounding the tiger 2010 is also shown. FIG. 20B depicts a test frame, where the tiger (the larger one at the bottom of the frame) moves towards the right in a downward direction. As the obtained contour 2020 in the base frame cannot be utilized as the reference contour in the test frame, motion estimation is applied to the base frame (FIG. 20A) and the test frame (FIG. 20B). The arrows 2030 in FIG. 20C represents the estimated movement by the object, where each arrow shows both the estimated direction of movement and the magnitude of a region in the frame.

Based on the motion information, the obtained contour is modified to the reference contour 2040, as shown in FIG. 20D, which is now a reliable contour in the test frame. The tracking algorithm is then applied to the test frame to derive the estimated contour 2050, as shown in FIG. 20E. The estimated contour and the reference contour are compared. As shown in FIG. 20F, five local regions 2060a, 2060b, 2060c, 2060d, 2060e are lost in the estimated contour, as shown in FIG. 20F. This signifies that the tracking algorithm currently being executed is unreliable weak, user refinement will likely be required to constantly refine the contour around these local regions 2060a, 2060b, 2060c, 2060d, 2060e. Therefore, the five local regions 2060a, 2060b, 2060c, 2060d, 2060e are designated as added local regions and recorded in the local region list so that they can be used for later tracking. Note that motion estimation is utilized in the test algorithm since if the estimated contour 2050 is compared with the obtained contour 2020 in its original location, both the location and the shape of the contours are quite different, and the tracking algorithm will not precisely yield the five local regions 2060a, 2060b, 2060c, 2060d, 2060e.

Figure 21A:
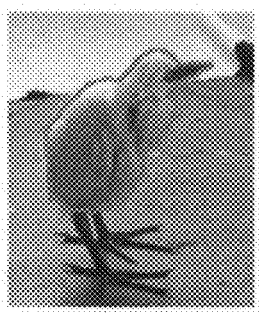
FIGS. 21A-D illustrate another example of the testing algorithm similar to the algorithm illustrated in FIG. 20A-F, where
Figure 21B:
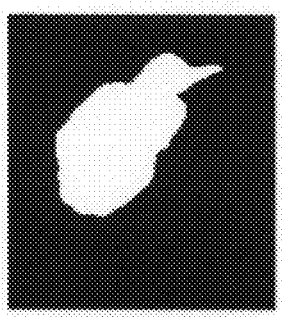
Figure 21C:
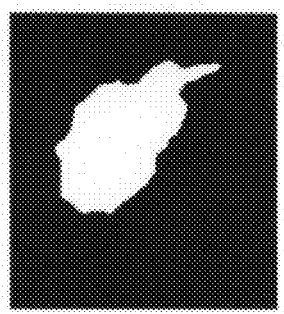
Figure 21D:
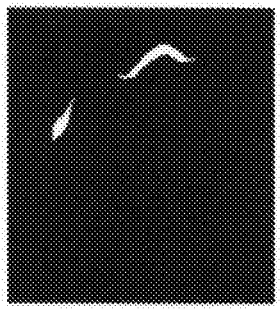

The testing algorithm can be applied in a more simple way in some different embodiments. Reference is made to FIGS. 21A-21D. The user begins by specifying a contour around the object of interest (i.e., the bird) in an initial frame, as shown in FIG. 21A, where the mask representation of the object region is shown in FIG. 21B. The algorithm then selects the initial frame as both the base frame and the test frame. Since the two frames are the same, the motion between frames should be all zeros and the reference contour is identical to the obtained contour. Then the tracking algorithm is applied to the frame, as if there are two successive frames with the same content. The object mask comprising the tracking result is shown in FIG. 21C. As shown, the region shrinks around the head portion of bird due to similarity of the background color to the object in this area. The contour also slightly shrinks at the back portion of the bird due to the large difference between the object and the background in terms of brightness level. There are also other small changes in the object region. However, the small changes may be treated as noise and discarded in accordance with some embodiments. Upon discarding the small changes, two main regions are identified, as shown in FIG. 21D, based on the difference between the object contours in FIG. 21B and FIG. 21C. The identified two regions are recorded in the local region list as added local regions, and they will be used to adjust the probability map generator 114 (FIG. 1), as discussed earlier.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method implemented in a media editing device for tracking an object in a plurality of frames, comprising:
obtaining a contour of an object in a frame;
generating a local region list for storing one or more of:
local regions added to the object contour and local regions removed from the object contour;
for each of the remaining frames of the plurality of frames, performing the steps of:
updating the local region list;

based on the content of a current frame, the content and the obtained contour of a prior frame, and the local regions in the local region list, generating, by a probability map generator, a plurality of probability maps containing probability values for pixels in the current frame, wherein a probability value of each pixel in a first probability map corresponds to a likelihood of the pixel being located within the object, and wherein a probability value of each pixel in a second probability map corresponds to a likelihood of the pixel being located at a boundary of the object;

estimating, for the current frame, a contour of the object based on the plurality of probability maps;

determining whether user input for refining the estimated contour is received;

in response to receiving user input, identifying, based on the user input, one of: at least one local region added to the estimated contour, at least one local region removed from the estimated contour, or any combination thereof;

for the current frame, recording the identified local regions in the local region list; and setting the obtained contour of the current frame to one of: the user refined contour or the estimated contour.

2. The method of claim 1, wherein the contour is obtained from a user via an object selection component in a user interface displayed to the user.

3. The method of claim 1, wherein the first probability map comprises a color model map, and wherein the second probability map comprises an edge map.

4. The method of claim 1, wherein generating, by the probability map generator, the plurality of probability maps containing probability values for pixels in the current frame comprises:

constructing a foreground color model according to a region inside the contour in a prior frame; and constructing a background color model according to a region outside the contour in the same frame or a different prior frame.

5. The method of claim 4, further comprising estimating the probability values in the first probability map according to similarities of pixel values in a current frame with respect to the foreground and background models.

6. The method of claim 4, further comprising estimating the probability values in the second probability map according to differences between pixel values and neighboring pixels, wherein larger probability values are assigned to pixels with relatively large difference values.

7. The method of claim 1, wherein estimating, for the current frame, the contour of the object based on the plurality of probability maps comprises:

selecting a contour as the estimated contour based on a highest contour score, wherein each contour score is calculated according to at least one of the following:

a total length of a contour boundary, wherein a higher contour score is assigned in response to a total length of the contour boundary being shorter;

the probability values of the pixels in the frame within the contour representing a likelihood of being located within the object, wherein a higher contour score is assigned in response to the probability values being higher; and the probability values of the pixels in the frame on the contour representing a likelihood of being located at the boundary of the object, wherein a higher contour score is assigned in response to the probability values being higher.

8. The method of claim 1, wherein obtaining user input refining the estimated contour comprises receiving a modification of the estimated contour from a user via an object selection component on a user interface.

9. The method of claim 1, wherein identifying one of: at least one local region added to the estimated contour, at least one local region removed from the estimated contour, or any combination thereof comprises:

determining at least one difference between the estimated contour and the refined estimated contour, wherein the at least one local region comprises the at least one difference.

10. The method of claim 1, wherein generating, by the probability map generator, the plurality of probability maps containing probability values for pixels in the current frame comprises:

configuring the probability map generator to generate higher probability values in the first probability map corresponding to the pixels within the added at least one local region; and configuring the probability map generator to generate lower probability values in the first probability map corresponding to the pixels within the removed at least one local region.

11. The method of claim 1, wherein generating, by the probability map generator, the plurality of probability maps containing probability values for pixels in the current frame comprises:

configuring the probability map generator to generate higher probability values in the second probability map corresponding to the pixels on a boundary of the added at least one local region or on a boundary of the removed at least one local region.

12. The method of claim 1, wherein recording the identified local regions in the local region list comprises:

for each identified local region, recording a contour and content of the local region in the local region list.

13. The method of claim 12, wherein updating the local region list based on content of the current frame comprises:

applying motion estimation to the current frame and a previous frame;

for each local region in the local region list, performing the steps of:

adjusting a contour of the local region in the current frame based on the applied motion estimation;

comparing the content of the local region recorded in the local region list with a content of the local region in the current frame; and removing the recorded local region from the local region list based on the comparison.

14. The method of claim 13, wherein the content of the recorded local region comprise pixels within the contour of the recorded local region, and wherein comparing the content of the recorded local region in the local region list with a content of the local region in the current frame is performed based on a sum of absolute difference between the pixels in the recorded local region and the pixels within the current contour of the local region in the current frame.

15. The method of claim 14, wherein the local region is removed if the computed sum of absolute difference is greater than a threshold.

16. The method of claim 1, further comprising:

selecting a test frame from the plurality of frames;

selecting one of the frames with the obtained contour as a base frame;

generating a reference contour according to the test frame, the base frame, and the obtained contour of the base frame;
estimating, for the test frame, a contour of the object;
based on the reference contour and the estimated contour, identifying one of: at least one local region included in the reference contour and not included in the estimated contour, at least one local region included in the estimated contour and not included in the reference contour, or any combination thereof; and
based on the identification of the at least one local region included in the reference contour and not included in the estimated contour, the at least one local region included in the estimated contour and not included in the reference contour, or any combination thereof, recording the local regions in the local region list, wherein a local region included in the reference contour is recorded as an added local region, and a local region not included in the reference contour is recorded as a removed local region.

17. The method of claim 16, wherein generating the reference contour according to the test frame, the base frame, and the obtained contour of the base frame comprises:
applying motion estimation to the test frame and the base frame;
generating a reference contour by modifying the obtained contour based on the motion estimation.

18. The method of claim 16, wherein a same frame is selected as both the base frame and the test frame, and wherein the reference contour is identical to the obtained contour of the frame.

19. A system for tracking an object in a plurality of frames, comprising:
a computing device including a processing device;
an application executable in the computing device for processing the plurality of frames, the application comprising:
an object selector for obtaining a contour of an object in a frame;
a local region analyzer for generating a local region list for storing one or more of: local regions added to the object contour and local regions removed from the object contour, wherein the local region analyzer is further configured to update the local region list for each of the remaining frames of the plurality of frames;
a probability map generator for generating, for each of the remaining frames of the plurality of frames, a plurality of probability maps containing probability values for pixels in the current frame based on the content of a current frame, the content and the obtained contour of a prior frame, and the local regions in the local region list, wherein a probability value of each pixel in a first probability map corresponds to a likelihood of the pixel being located within the object, and wherein a probability value of each pixel in a second probability map corresponds to a likelihood of the pixel being located at a boundary of the object;
a contour estimator for estimating, for the current frame, a contour of the object based on the plurality of probability maps;
a refinement module for determining whether user input for refining the estimated contour is received;
wherein the local region analyzer is further configured to identify, in response to receiving user input, one of: at least one local region added to the estimated contour, at least one local region removed from the estimated contour, or any combination thereof based on the user input;
wherein the local region analyzer is further configured to record, for the current frame, the identified local regions in the local region list; and
wherein the contour estimator is further configured to set the obtained contour of the current frame to one of: the user refined contour or the estimated contour.

20. The system of claim 19, wherein the probability map generator generates the plurality of probability maps containing probability values for pixels in the current frame by constructing a foreground color model according to a region inside the contour in a prior frame; and constructing a background color model according to a region outside the contour in the same frame or a different prior frame.

21. The system of claim 20, wherein the probability map generator estimates the probability values in the first probability map according to similarities of pixel values in a current frame with respect to the foreground and background models.

22. The system of claim 20, wherein the probability map generator estimates the probability values in the second probability map according to differences between pixel values and neighboring pixels, wherein larger probability values are assigned to pixels with relatively large difference values.

23. The system of claim 19, wherein the contour estimator estimates, for the current frame, the contour of the object based on the plurality of probability maps by selecting a contour as the estimated contour based on a highest contour score, wherein each contour score is calculated according to at least one of the following:
a total length of a contour boundary, wherein a higher contour score is assigned in response to a total length of the contour boundary being shorter;
the probability values of the pixels in the frame within the contour representing a likelihood of being located within the object, wherein a higher contour score is assigned in response to the probability values being higher; and
the probability values of the pixels in the frame on the contour representing a likelihood of being located at the boundary of the object, wherein a higher contour score is assigned in response to the probability values being higher.

24. The system of claim 19, wherein the local region analyzer identifies one of: at least one local region added to the estimated contour, at least one local region removed from the estimated contour, or any combination thereof by determining at least one difference between the estimated contour and the refined estimated contour, wherein the at least one local region comprises the at least one difference.

25. A non-transitory computer-readable medium embodying a program executable in a computing device for tracking an object in a plurality of frames, comprising:
code that obtains a contour of an object in a frame;
code that generates a local region list for storing one or more of: local regions added to the object contour and local regions removed from the object contour;
code that updates the local region list for each of the remaining frames of the plurality of frames;
code that generates, based on the content of a current frame, the content and the obtained contour of a prior frame, and the local regions in the local region list, a plurality of probability maps containing probability values for pixels in the current frame for each of the remaining frames of the plurality of frames, wherein a probability value of each pixel in a first probability map corresponds to a likelihood of the pixel being located within the object, and wherein a probability value of each pixel in a second probability map corresponds to a likelihood of the pixel being located at a boundary of the object;

code that estimates, for the current frame, a contour of the object based on the plurality of probability maps for each of the remaining frames of the plurality of frames;

code that determines whether user input for refining the estimated contour is received for each of the remaining frames of the plurality of frames;

code that identifies, in response to receiving user input and based on the user input, one of: at least one local region added to the estimated contour, at least one local region removed from the estimated contour, or any combination thereof for each of the remaining frames of the plurality of frames;

code that records, for the current frame, the identified local regions in the local region list for each of the remaining frames of the plurality of frames; and code that sets the obtained contour of the current frame to one of: the user refined contour or the estimated contour for each of the remaining frames of the plurality of frames.

26. The non-transitory computer-readable medium of claim 25, wherein the code that identifies one of: at least one local region added to the estimated contour, at least one local region removed from the estimated contour, or any combination thereof by determining at least one difference between the estimated contour and the refined estimated contour, wherein the at least one local region comprises the at least one difference.

* * * * *